United States Patent
Jeong et al.

(10) Patent No.: US 11,428,455 B2
(45) Date of Patent: Aug. 30, 2022

(54) DEFROSTING APPARATUS AND REFRIGERATOR COMPRISING SAME

(71) Applicant: LG Electronics Inc., Seoul (KR)

(72) Inventors: Minjae Jeong, Seoul (KR); Woocheol Kang, Seoul (KR); Geunhyung Lee, Seoul (KR); Eonhwa Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 239 days.

(21) Appl. No.: 16/616,817

(22) PCT Filed: Dec. 21, 2017

(86) PCT No.: PCT/KR2017/015268
§ 371 (c)(1),
(2) Date: Nov. 25, 2019

(87) PCT Pub. No.: WO2018/216869
PCT Pub. Date: Nov. 29, 2018

(65) Prior Publication Data
US 2021/0172671 A1    Jun. 10, 2021

(30) Foreign Application Priority Data

May 25, 2017   (KR) .......................... 10-2017-0064810

(51) Int. Cl.
*F25D 21/08*    (2006.01)
*F25D 21/00*    (2006.01)

(52) U.S. Cl.
CPC ........... *F25D 21/08* (2013.01); *F25D 21/002* (2013.01)

(58) Field of Classification Search
CPC .. F25D 21/08; F25D 21/12; F25D 2321/1413; F25D 2321/143; F25D 2321/146; F25D 21/002
See application file for complete search history.

(56) References Cited

U.S. PATENT DOCUMENTS

| | | | | |
|---|---|---|---|---|
| 5,339,644 A | * | 8/1994 | Singh | F25D 21/08 62/275 |
| 5,729,995 A | * | 3/1998 | Tajima | F28D 15/0266 165/104.21 |
| 6,442,341 B1 | * | 8/2002 | Wu | A47J 31/542 392/479 |
| 6,684,659 B1 | * | 2/2004 | Tanaka | F25D 21/08 62/276 |

(Continued)

FOREIGN PATENT DOCUMENTS

| | | |
|---|---|---|
| DE | 3145445 | 8/1982 |
| JP | H07120132 | 5/1995 |

(Continued)

OTHER PUBLICATIONS

EP Extended European Search Report in European Appln. No. 17910919.4, dated Mar. 26, 2021, 8 pages.

(Continued)

*Primary Examiner* — Kun Kai Ma
(74) *Attorney, Agent, or Firm* — Fish & Richardson P.C.

(57) ABSTRACT

A defrosting apparatus includes: a heating unit including a heater case and a heater, where the heater case defines an inner flow path having an inlet and an outlet at ends thereof, and the heater is mounted in the heater case to heat a working fluid within the inner flow path; and a heat pipe inserted into the inside of the heater case through the inlet and the outlet, and which has at least a part thereof disposed to be adjacent to a cooling pipe of an evaporator such that heat is radiated to the cooling pipe of the evaporator by means of the working fluid at a high temperature that is heated by the heater and then is transferred, where the heater is configured to stop emit heat at a preset temperature or higher since an electric current is suppressed due to a sharp increase in resistance.

20 Claims, 18 Drawing Sheets

(56) References Cited

U.S. PATENT DOCUMENTS

| | | | | |
|---|---|---|---|---|
| 9,127,875 | B2* | 9/2015 | Hall | F25D 21/08 |
| 9,191,996 | B2* | 11/2015 | Miyamoto | F25D 21/08 |
| 9,243,834 | B2* | 1/2016 | Kim | F25D 21/006 |
| 9,310,121 | B2* | 4/2016 | Bonet | F25D 21/08 |
| 9,482,462 | B2* | 11/2016 | Beilfuss | F25D 21/08 |
| 9,638,455 | B2* | 5/2017 | Kim | F25D 21/08 |
| 9,644,887 | B2* | 5/2017 | Chung | F25D 17/067 |
| 2011/0073586 | A1* | 3/2011 | Lim | F25D 21/08 |
| | | | | 219/546 |
| 2015/0204538 | A1* | 7/2015 | Brice | F24H 3/087 |
| | | | | 126/91 A |
| 2017/0131018 | A1* | 5/2017 | Shin | F25D 21/06 |

FOREIGN PATENT DOCUMENTS

| | | |
|---|---|---|
| KR | 1020060014483 | 2/2006 |
| KR | 20110062631 | 6/2011 |
| KR | 20160022735 | 3/2016 |
| KR | 20160046713 | 4/2016 |
| KR | 1020160088777 | 7/2016 |
| KR | 20170046543 | 5/2017 |
| KR | 20170046545 | 5/2017 |
| KR | 1020170046543 | 5/2017 |
| KR | 20180026977 | 3/2018 |
| WO | WO-2012120708 A1 * 9/2012 ............. F24H 1/121 |
| WO | WO-2016064200 A2 * 4/2016 ............. F25D 21/08 |
| WO | WO2017078250 | 5/2017 |

OTHER PUBLICATIONS

Office Action in Korean Appln. No. 1020170177458, dated Oct. 20, 2021, 19 pages (with English translation).

International Search Report for International Application No. PCT/KR2017/015268, dated Mar. 29, 2018, 2 pages.

* cited by examiner

DEFROSTING APPARATUS AND REFRIGERATOR COMPRISING SAME

CROSS-REFERENCE TO RELATED APPLICATIONS

This application is a National Stage application under 35 U.S.C. § 371 of International Application No. PCT/KR2017/015268, filed on Dec. 21, 2017, which claims the benefit of Korean Application No. 10-2017-0064810, filed on May 25, 2017. The disclosures of the prior applications are incorporated by reference in their entirety.

TECHNICAL FIELD

The present disclosure relates to a defrosting apparatus for removing frost on an evaporator provided in a refrigeration cycle, and a refrigerator having the same.

BACKGROUND ART

A refrigerator is a machine for low temperature storage of food stored therein by using cold air generated by a refrigeration cycle in which processes of compression, condensation, expansion and evaporation are performed consecutively.

A refrigeration cycle in a refrigerating chamber includes a compressor that compresses a refrigerant, a condenser that condenses the refrigerant at a high temperature and a high pressure compressed by the compressor, and an evaporator that cools adjacent air by a cooling action that the refrigerant provided from the condenser evaporates and absorbs ambient latent heat. Capillary tubes or expansion valves are provided between the condenser and the evaporator to increase the flow rate of the refrigerant and to lower pressure so that the refrigerant induced into the evaporator may evaporate easily.

As such, the evaporator provided in the refrigeration cycle lowers ambient temperature by using cold air generated by circulation of the refrigerant flowing through a cooling pipe. In this process, when there is a difference between the temperature of the evaporator and the temperature of surrounding air, moisture in the air may be condensed and frozen on the surface of the cooling pipe and generate frost. The frost formed on the evaporator acts as a factor that lowers the heat exchange efficiency of the evaporator.

A hot wire has been used to remove the frost formed on the evaporator in the related art. However, in a defrosting structure using the hot wire, proper temperature required for defrosting was not passed on to specific parts of the evaporator, causing a problem of energy loss.

For this reason, the company to which this disclosure pertains is developing a defrosting apparatus having a new structure in which working fluid heated by a heater performs defrosting while passing through a heat pipe.

Since the defrosting apparatus is a device that performs defrosting by applying heat, it is most important to prevent overheating of the heater which generates high temperature heat in order to ensure safety. Overheating of the heater causes shortening of the lifetime of the heater, deterioration of the efficiency of the evaporator, and the like. In some cases, when the heater is excessively overheated, the heater may be damaged and may not be able to be restarted later. Therefore, preventing overheating of the heater may be said to be an important issue that is related to operational reliability of the refrigerator.

Recently, a technique of protecting a heater by connecting a fuse to the heater so that the fuse is blown when the heater is overheated has been studied. However, after the fuse is blown, the electrical connection between the heater and the power supply unit is cut off, and thus the heater may not be restarted.

DETAILED DESCRIPTION OF THE DISCLOSURE

Technical Problem

A first aspect of the present disclosure is to provide a new heater, capable of securing safety even without using a fuse as a safety device for overheating of the heater.

A second aspect of the present disclosure is to provide a heating unit having a new structure that can solve problems of a structural complexity and an increase in cost of the related art heating unit having a safety device.

A third aspect of the present disclosure is to provide a structure in which a circulation of a working fluid during defrosting can be made better in this new heating unit.

A fourth aspect of the present disclosure is to provide a structure, capable of reducing heat loss caused in a case that heat generated in a heater is not used to heat a working fluid but is released to outside of a heater case.

A fifth aspect of the present disclosure is to provide a heating unit having various structures, in which a heater can be firmly attached to at least one surface of a heater case.

A sixth aspect of the present disclosure is to provide a heating unit, capable of more efficiently removing frost accumulated on a heater case.

Technical Solution

In order to achieve the first aspect of the present disclosure, a defrosting apparatus according to the present disclosure may include a heating unit provided with a heater case having an inner flow path which has an inlet and an outlet in both ends thereof, respectively, and a heater mounted in the heater case so as to heat a working fluid within the inner flow path, and a heat pipe which is inserted into the heater case through the inlet and the outlet so as to be in communication with the inner flow path, and which has at least a part disposed to be adjacent to a cooling pipe of an evaporator, such that heat is dissipated to the cooling pipe of the evaporator from the working fluid of high temperature that is heated by the heater and then is transferred. The heater may not further emit heat at a preset temperature or higher since an electric current is suppressed due to a sharp increase in resistance.

The heater may include a Positive Temperature Coefficient (PTC) thermistor having a property/characteristic that resistance increases as temperature increases.

The heater may further include first and second electrode plates disposed to face each other with the PTC thermistor interposed therebetween.

In the above structure, in order to achieve the second aspect of the present disclosure, the heater case may be provided therein with a heater receiving part extending in parallel to the inner flow path and may be open at both ends, so that the heater is inserted.

In addition, the heater may further include an insulating film for accommodating the first and second electrode plates with the PTC thermistor interposed therebetween.

In the above structure, in order to achieve the third aspect of the present disclosure, grooves may be formed along a circumference of the inner flow path to extend along the inner flow path.

The grooves may be continuously formed along the circumference of the inner flow path.

In the above structure, in order to achieve the fourth aspect of the present disclosure, holes may be formed around the inner flow path. The holes may extend in parallel to the inner flow path and be open at both ends of the heater case.

The holes may be located between the inner flow path and corners of the heater case.

In the above structure, in order to achieve the fifth aspect of the present disclosure, the heater case may have a pressed portion in a shape recessed toward the heater receiving part, and the heater may be pressed by the pressed portion to be in close contact with an inner surface of the heater receiving part.

In a state where the heater is mounted in the heater receiving part, a sealing member may be filled in the heater receiving part to seal the heater.

Or, the fifth aspect of the present disclosure may be achieved by a defrosting apparatus which may include a heater case provided with an inner flow path having an inlet and an outlet on both ends thereof, respectively, a heat pipe that is inserted into the heater case through the inlet and the outlet so as to be in communication with the inner flow path, a heater that is attached on one surface of the heater case to heat a working fluid within the inner flow path, a holder mounted on the heater case and disposed to cover the heater, and an elastic member that is interposed in a compressed state between the heater and the holder so that the heater is in close contact with the one surface of the heater case.

A sixth aspect of the present disclosure may be achieved by arranging the heater receiving part to be positioned above the inner flow path in a structure in which the heating unit is disposed in a left-right direction of the evaporator.

In addition, the present disclosure may have structures as follows.

The heat pipe may include a first heat pipe and a second heat pipe disposed at front and rear surfaces of the evaporator, respectively. The outlet may be formed as a single opening for accommodating one end portion of the first and second heat pipes, and the inlet may be formed as a single opening for accommodating another end portion of the first and second heat pipes.

The heating unit may further include a first welding portion formed to fill a gap between one end portion of the heat pipe and the outlet, and a second welding portion formed to fill a gap between the another end portion of the heat pipe and the inlet.

The heating unit may further include a heater mounting portion formed in a bottom surface of the heater case in a manner of being recessed toward an upper part of the heater case, and a sealing member filled in the heater mounting portion and disposed to cover the heater attached to a recessed bottom surface of the heater mounting portion.

Advantageous Effects

The present disclosure may obtain the following effects through the above-described solutions.

First, by using a heater having a characteristic of not generating heat above a preset temperature due to a current being suppressed, safety of the heater can be secured even without using a fuse as a safety device provided in the related art heating unit.

Second, since the heater provided in the heating unit of the present disclosure is wrapped with an insulation sheet, a separate insulator is unnecessary. In addition, when the heater has a structure accommodated in a heater receiving part formed in a heater case, a holder for fixing a safety device is also unnecessary. Therefore, the heating unit of the present disclosure can be structurally simple and easy to be manufactured, thereby reducing a manufacturing cost.

Third, in a case where grooves are repeatedly formed along a circumference of an inner flow path of the heater case, a heat generating area of a working fluid increases and thereby working pressure of the working fluid increases, which may result in stabilizing circulation of the working fluid and reliability of defrosting.

Fourth, a hole is formed around the inner flow path of the heater case to suppress external discharge of heat, thereby reducing a possibility that heat transferred to the inner flow path is not used to heat the working fluid but is discharged to outside of the heater case to lead to a heat loss, and thereby concentrating more heat in the inner flow path.

Fifth, the heater can be firmly attached on at least one surface of the heater case by use of a structure in which the heater is fixed by a filling of a sealing member after being pressed in a state accommodated in the heater receiving part formed in the heater case, or a structure in which the heater is fixed to the heater case in a closely-adhered state by an elastic member interposed between the heater and the holder. Accordingly, more heat generated from the heater can be transferred to the inner flow path and used for heating the working fluid.

Sixth, in a structure in which the heating unit is arranged in a left-right direction of an evaporator, when the heater receiving part is arranged to be positioned above the inner flow path, heat generated from the heater can be not only used to heat the working fluid, but also used to remove frost accumulated on the heater case, thereby improving thermal efficiency of the heater.

MODES FOR CARRYING OUT PREFERRED EMBODIMENTS

Hereinafter, descriptions will be given in more detail of a defrosting apparatus and a refrigerator having the same according to the present disclosure, with reference to the accompanying drawings.

For the sake of brief description with reference to the drawings, the same or equivalent components will be provided with the same reference numbers, and description thereof will not be repeated.

In addition, even though the embodiments are different each other, as long as the embodiments do not contradict each other structurally and functionally, the structure applied to one embodiment may be equally applied to another embodiment.

A singular representation may include a plural representation unless it represents a definitely different meaning from the context.

In describing the present disclosure, when a detailed explanation for a related known function or construction is considered to unnecessarily divert the gist of the present disclosure, such explanation has been omitted but would be understood by those skilled in the art.

The accompanying drawings are used to help easy understanding of the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1:
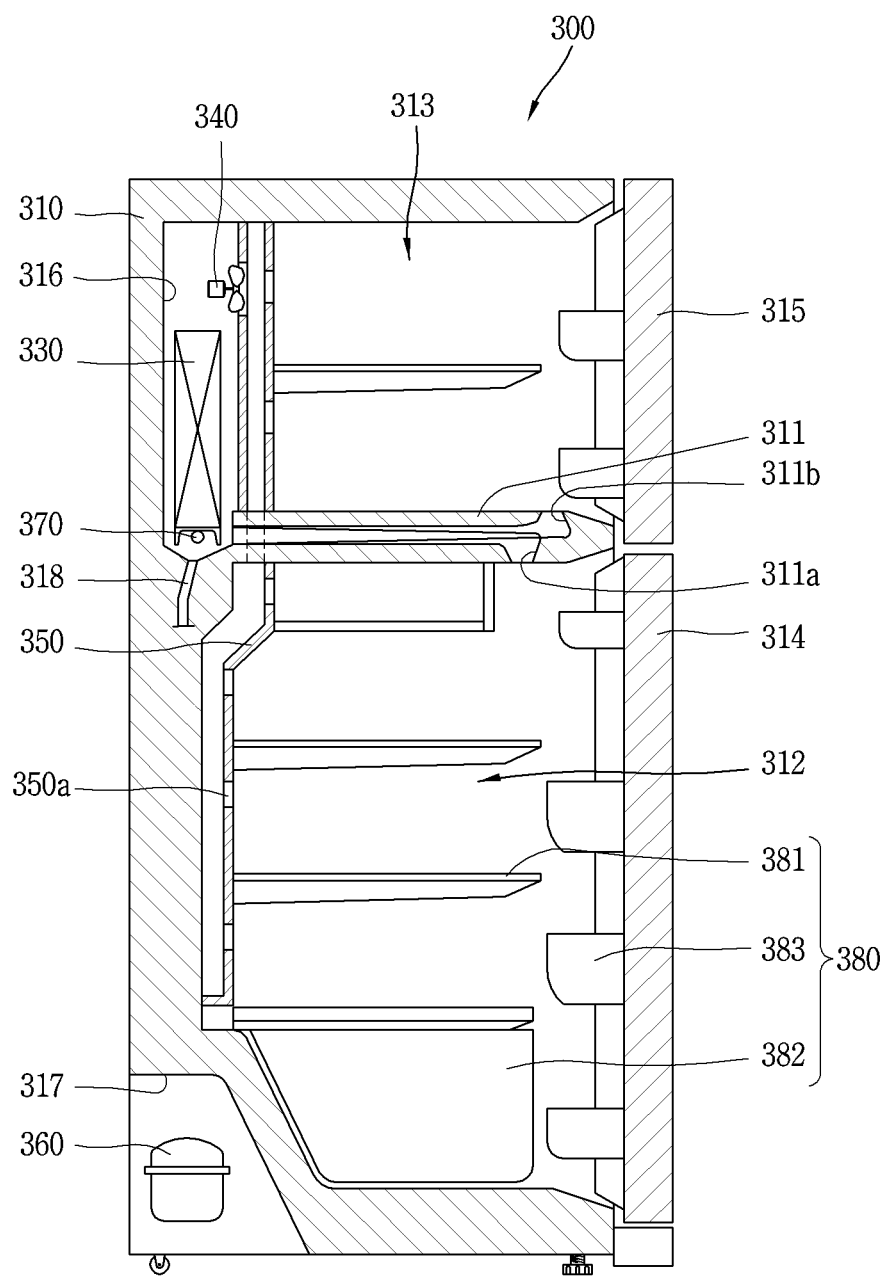
FIG. 1 is a longitudinal sectional view illustrating a configuration of a refrigerator in accordance with one embodiment of the present disclosure.

FIG. 1 is a longitudinal sectional view schematically illustrating a configuration of a refrigerator 300 according to one embodiment of the present disclosure.

The refrigerator 300 is a machine for keeping foods stored therein at low temperature by using cold air generated by a refrigeration cycle in which processes of compression, condensation, expansion and evaporation are performed consecutively.

As illustrated, a refrigerator body 310 has a storage space for storing food therein. The storage space may be divided by a partition wall 311 and may be divided into a refrigerating chamber 312 and a freezing chamber 313 according to a set temperature.

In this embodiment, it is shown that the refrigerator is a top mount type in which the freezing chamber 313 is disposed on top of the refrigerating chamber 312, but the present disclosure is not limited thereto. The present disclosure may alternatively be applied to a side by side type refrigerator in which the refrigerating chamber and the freezing chamber are arranged left and right, a bottom freezer type refrigerator in which a refrigerating chamber is provided at an upper portion and a freezing chamber is provided at a lower portion thereof.

Doors are connected to the refrigerator body 310 to open and close the front opening of the refrigerator body 310. This drawing illustrates that a refrigerating chamber door 314 and a freezing chamber door 315 are configured to open and close front sides of the refrigerating chamber 312 and the freezing chamber 313, respectively. Doors may be variously configured, for example, as a rotatable door rotatably connected to the refrigerator body 310, a drawer-type door connected to the refrigerator body 310 to be slidably movable, and the like.

The refrigerator body 310 includes at least one storage unit 180 (e.g., a shelf 381, a tray 382, a basket 383, etc.) for efficient use of the internal storage space. For example, the shelf 381 and the tray 382 may be installed inside the refrigerator body 310, and the basket 383 may be installed on an inner side of the door 314 connected to the refrigerator body 310.

Meanwhile, a cooling chamber 316 provided with an evaporator 330 and a blowing fan 340 is provided at the rear side of the freezing chamber 313. The partition wall 311 is provided with a refrigerating chamber return duct 311a and a freezing chamber return duct 311b that allow air in the refrigerating chamber 312 and the freezing chamber 313 to be sucked and returned to the cooling chamber 316. In addition, a cold air duct 350 is provided at the rear side of the refrigerating chamber 312. The cold air duct 350 communicates with the freezing chamber 313 and has a plurality of cold air discharge ports 350a at the front side thereof.

A machine room 317 is provided in a lower rear side of the refrigerator body 310, and a compressor 360 and a condenser (not shown) are provided inside the machine room 317.

On the other hand, air in the refrigerating chamber 312 and the freezing chamber 313 is sucked into the cooling chamber 316 through the refrigerating chamber return duct 311a and the freezing chamber return duct 311b at the partition wall 311 by the blowing fan 340 in the cooling chamber 316 so as to perform heat exchange with the evaporator 330. The heat-exchanged air is then discharged to the refrigerating chamber 312 and the freezing chamber 313 through the cold air discharge ports 350a at the cold air duct 350. These processes are repeatedly performed. At this time, frost is formed on a surface of the evaporator 330 due to a temperature difference between air in the evaporator 330 and circulated air re-introduced through the refrigerating chamber return duct 311a and the freezing chamber return duct 311b.

In order to remove such frost, the evaporator 330 is provided with a defrosting apparatus 370, and water removed by the defrosting apparatus 370, that is, defrosted water, is collected in a defrosted water collector (not shown) positioned in a lower part of the refrigerator body 310 through a defrosted water discharge pipe 318.

Hereinafter, the defrosting apparatus 370 will be described in more detail.

Figure 2:
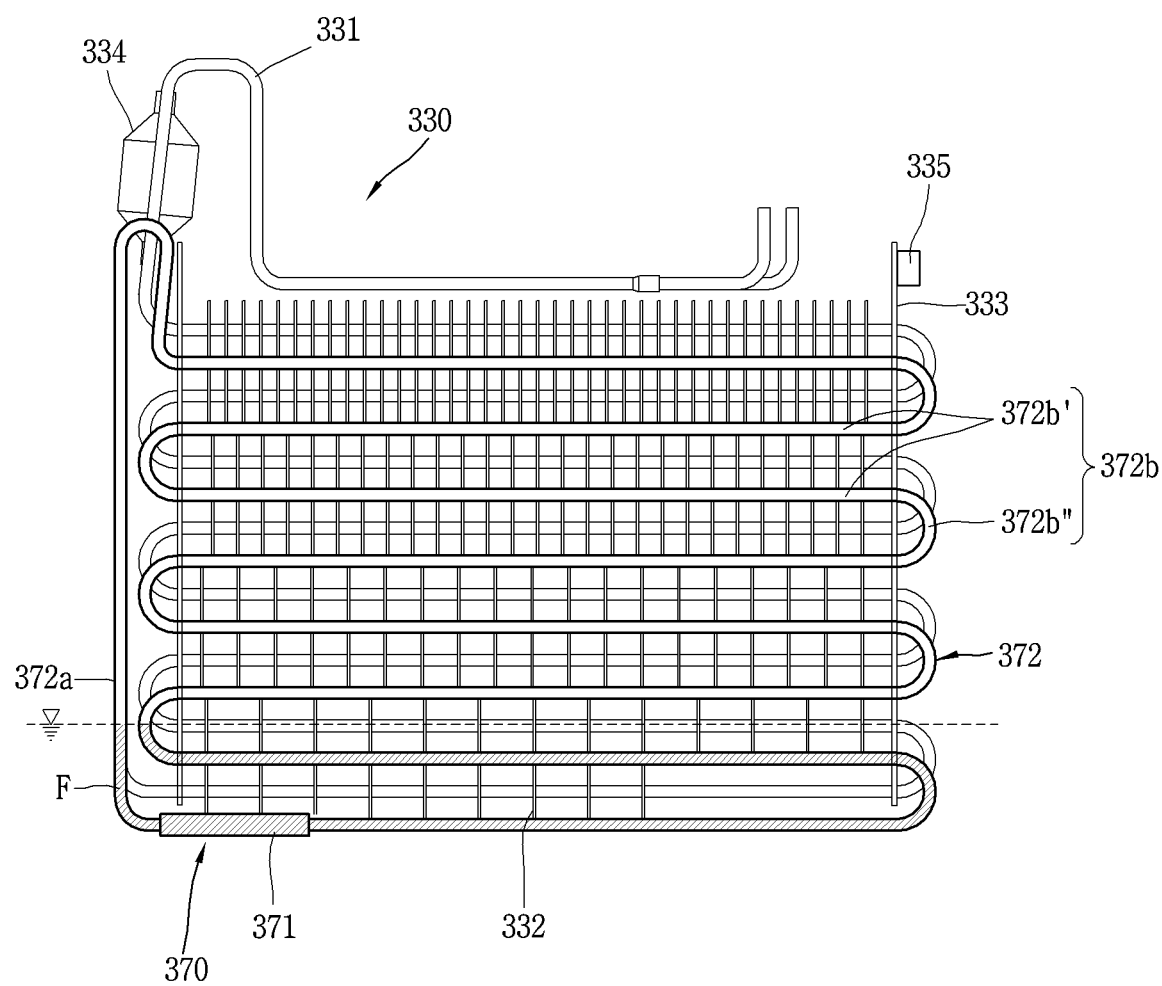
FIGS. 2 and 3 are a planar view and a perspective view illustrating one example of a defrosting apparatus applied to the refrigerator in FIG. 1.
Figure 3:
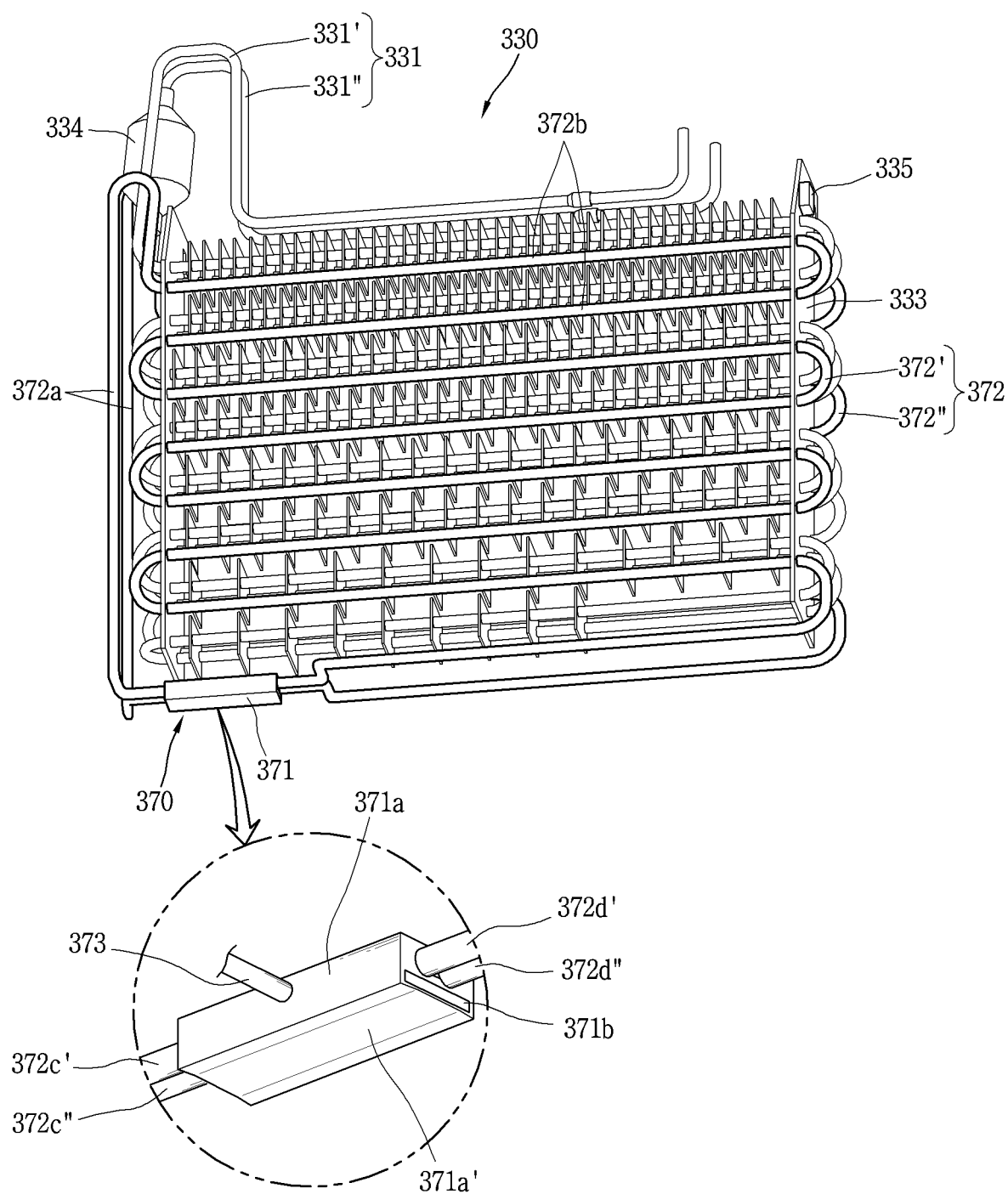

FIGS. 2 and 3 are a planar view and a perspective view illustrating one example of the defrosting apparatus 370 applied to the refrigerator 300 in FIG. 1.

Referring to FIGS. 2 and 3, the evaporator 330 includes a cooling pipe 331, a plurality of cooling pins 332, and supports 333.

The cooling pipe 331 is repeatedly bent in a zigzag form to form a plurality of steps or columns, and a refrigerant is filled therein. The cooling pipe 331 may be formed of aluminum.

The cooling pipe 331 may be configured by combination of horizontal pipe-lines and bending pipe-lines. The horizontal pipe-lines are arranged horizontally with each other in an up-down direction to form a plurality of columns, and the horizontal pipe-lines of each column are configured to penetrate through the cooling pins 332. The bending pipe-lines are configured to connect an end of an upper horizontal pipe-line and an end of a lower horizontal pipe-line, so that the upper and lower horizontal pipe-lines communicate with each other.

The cooling pipe 331 is supported by penetrating through the supports 333 provided at left and right sides of the evaporator 330, respectively. At this time, the bending pipe-line of the cooling pipe 331 is configured to connect the end of the upper horizontal pipe-line and the end of the lower horizontal pipe-line at the outer side of the support 333.

Referring to FIG. 3, in this embodiment, a first cooling pipe 331' and a second cooling pipe 331" are disposed at a front portion and a rear portion of the evaporator 330, respectively, to form two rows. For reference, in FIG. 2, the first cooling pipe 331' at the front and the second cooling pipe 331" at the rear are formed in the same shape, and therefore the second cooling pipe 331" is hidden by the first cooling pipe 331'.

However, the present disclosure is not limited thereto. The first cooling pipe 331' at the front and the second cooling pipe 331" at the rear may alternatively be formed in different shapes. On the other hand, the cooling pipe 331 may be formed in a single row.

In the cooling pipe 331, a plurality of cooling pins 332 is spaced apart from each other at a predetermined distance along an extending direction of the cooling pipe 331. The cooling pin 332 may be formed of a flat plate made of aluminum, and the cooling pipe 331 may be expanded in a state of being inserted into insertion holes of the cooling pins 332 to be firmly fitted into the insertion holes.

A plurality of supports 333 is provided at both the left and right sides of the evaporator 330, and each perpendicularly extends in an up-down direction to support the cooling pipe 331 inserted therethrough. The supports 333 each is provided with an insertion groove or an insertion hole through which the heat pipe 372 to be described later is fixedly inserted.

The defrosting apparatus 370 is installed at the evaporator 330 to remove frost generated at the evaporator 330. The defrosting apparatus 370 includes a heating unit 371 and a heat pipe 372 (heat-transfer pipe).

The heating unit 371 is disposed at a lower part the evaporator 330, and is electrically connected to a controller (not shown) to generate heat when a driving signal is received from the controller.

The controller may be configured to apply a driving signal to the heating unit 371 at predetermined time intervals. For example, when a predetermined time elapses after the compressor 360 is turned on, the controller may turn off (OFF) the compressor 360 and turn on a power supply unit (not shown) to supply power to a heater 371b (see FIG. 4).

The control of the controller is not limited to such time control. The controller may also be configured to apply a driving signal to the heating unit 371 when a detected temperature of the cooling chamber 316 drops at or below the preset temperature.

The heat pipe 372 is connected with the heating unit 371 to form a closed loop type flow path, through which a working fluid F can circulate, with the heating unit 371. The heat pipe 372 may be formed of aluminum.

At least part of the heat pipe 372 is disposed to be adjacent to the cooling pipe 331 so that heat is dissipated to the cooling pipe 331 of the evaporator 330 by the working fluid F of high temperature heated and transferred from the heating unit 371. The working fluid F may be a refrigerant (for example, R-134a, R-600a, etc.) that exists in a liquid phase in a freezing condition of the refrigerator 300 but changes the liquid phase to a gas phase when heated so as to transfer heat.

The heat pipe 372 may include a first heat pipe 372' and a second heat pipe 372" disposed at the front and the rear of the evaporator 330, respectively. In this embodiment, the first heat pipe 372' is disposed at the front of the first cooling pipe 331' and the second heat pipe 372" is disposed at the rear of the second cooling pipe 331", so as to form two rows.

The heat pipe 372 may be configured to be accommodated between the plurality of cooling pins 332 fixed to the respective columns of the cooling pipe 331. According to the above structure, the heat pipe 372 is arranged between the neighboring columns of the cooling pipe 331. In this case, the heat pipe 372 may also be configured to contact the cooling pins 332.

However, the present disclosure is not limited thereto. For example, the heat pipe 372 may be installed to penetrate through the plurality of cooling pins 332. That is, the heat pipe 372 may be expanded in the state of being inserted into the insertion holes of the cooling pins 332 to be firmly fitted into the insertion holes. According to the above structure, the heat pipe 372 is disposed to correspond to the cooling pipe 331.

Figure 4:
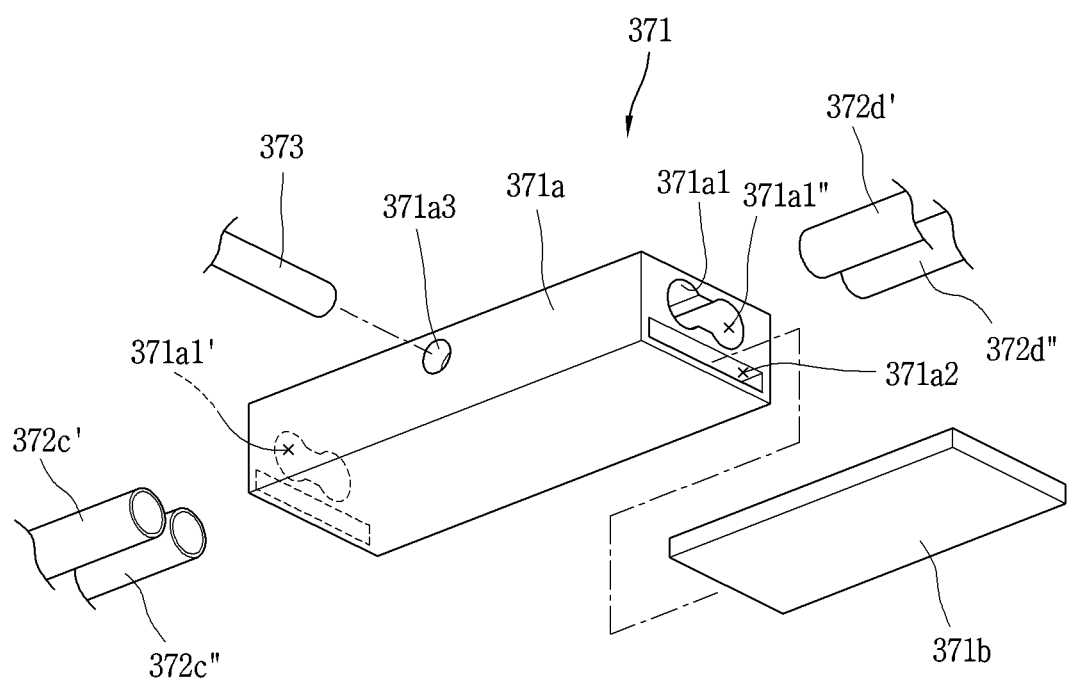
FIG. 4 is an exploded perspective view illustrating a first embodiment of a heating unit illustrated in FIG. 3.
Figure 5:
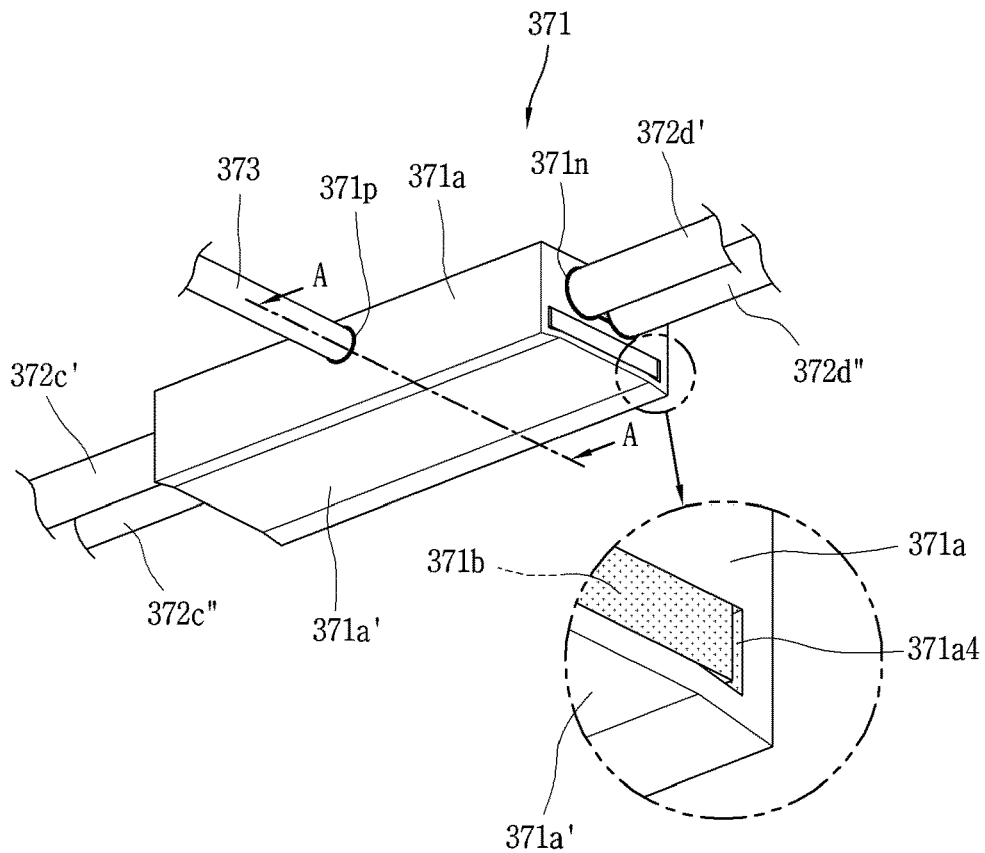
FIG. 5 is a view illustrating a structure in which a heater is tightly fixed to a heater receiving part of a heater case in a pressing manner.
Figure 6:
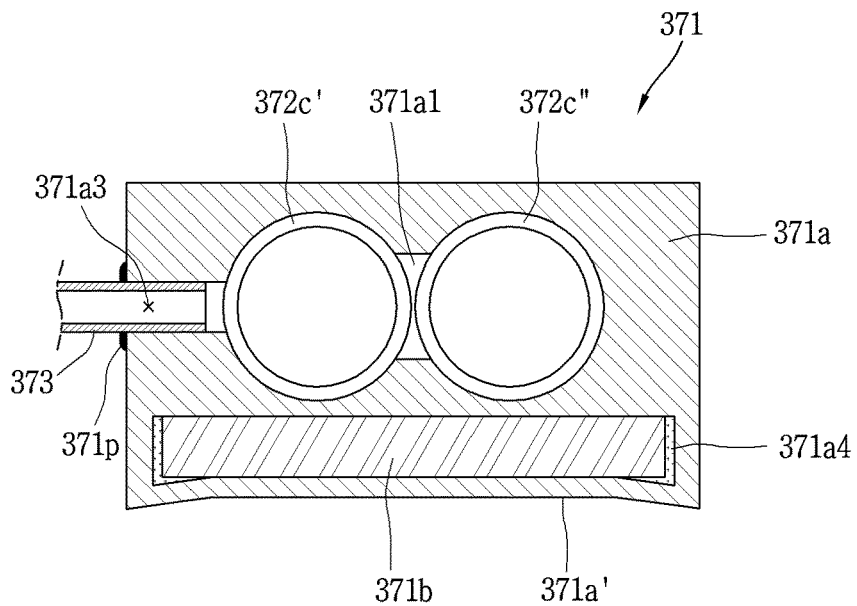
FIG. 6 is a sectional view illustrating a heater case illustrated in FIG. 5, taken along the line A-A.

FIG. 4 is an exploded perspective view illustrating a first embodiment of the heating unit illustrated in FIG. 3, FIG. 5 is a view illustrating a structure in which a heater 371b is tightly fixed to a heater receiving part 371a2 of a heater case 371a in a pressing manner, and FIG. 6 is a sectional view illustrating the heater case 371a illustrated in FIG. 5, taken along the line A-A.

Regarding the heating unit 371 with reference to the drawings in detail, the heating unit 371 includes a heater case 371a and a heater 371b.

The heater case 371a is formed as a single body having an outlet 371a1' and an inlet 371a1" formed at both end portions in a lengthwise direction. An inner flow path 371a1 extending from the inlet 371a1" toward the outlet 371a1' is formed inside the heater case 371a. That is, the inner flow path 371a1 is formed to extend along the lengthwise direction of the heater case 371a, and is open at the both end portions of the heater case 371a to form the outlet 371a1' and the inlet 371a1", respectively.

The heater case 371a is connected to both end portions of the heat pipe 372 to form a closed loop type circulation flow path, through which the working fluid F can circulate, together with the heat pipe 372. That is, the both end portions of the heat pipe 372 are inserted into the heater case 371a through the outlet 371a1' and the inlet 371a1" so as to be in communication with the inner flow path 371a1.

Specifically, the outlet 371a1' into which one end portion, namely, an introduction portion 372c', 372c" of the heat pipe 372 is inserted is configured at one end portion of the heater case 371a (for example, a front end portion of the heater case 371*a*). The working fluid F in the inner flow path 371*a*1 heated by the heater 371*b* is discharged into the introduction portion 372*c*', 372*c*" of the heat pipe 372 inserted into the outlet 371*a*1'.

The inlet 371*a*1" into which another end portion, namely, a return portion 372*d*', 372*d*" of the heat pipe 372 is inserted is configured in the another end portion of the heater case 371*a* (for example, a rear end portion of the heater case 371*a*). The working fluid F condensed while passing through the heat pipe 372 is returned into the inner flow path 371*a*1 through the return portion 372*d*', 372*d*" of the heat pipe inserted into the inlet 371*a*1".

The heater case 371*a* is provided with a heater receiving part 371*a*2 into which the heater 371*b* is inserted. The heater receiving part 371*a*2 extends in parallel to the inner flow path 371*a* and is open at both ends of the heater case 371*a*. That is, the heater receiving part 371*a*2 is formed to penetrate through the heater case 371*a*. This drawing illustrates that the heater receiving part 371*a*2 is formed below the inner flow path 371*a*.

As such, the structure in which the heater receiving part 371*a*2 in the shape of the insertion hole is formed in the heater case 371*a* has an advantage in that the heater 371*b* is easily mounted and a separate adhesive for attaching the heater to the heater case 371*a* is unnecessary.

The heater case 371*a* may be formed to have appearance in a square pillar shape. In addition, the heater case 371*a* may be formed of a metal material (for example, aluminum).

The heater case 371*a* may be formed by extrusion molding. In this case, the inner flow path 371*a*1 and the heater receiving part 371*a*2 are formed to extend in a direction of extrusion molding, that is, in the lengthwise direction of the heater case 371*a*. Also, in this case, the inlet 371*a*1" and the outlet 371*a*1' have the same size. Accordingly, the inlet 371*a*1" and the outlet 371*a*1' of the heater case 371*a* are disposed to face each other, and the return portion 372*d*', 372*d*" and the introduction portion 372*c*', 372*c*" of the heat pipe 372 inserted into the inlet 371*a*1" and the outlet 371*a*1', respectively, are also disposed to face each other.

The heater case 371*a* may be disposed at one side of the evaporator 330 at which an accumulator 334 is located, at another side opposite to the one side, or at any position between the one side and the another side.

The heater case 371*a* may be disposed to be adjacent to a lowest column of the cooling pipe 331. For example, the heater case 371*a* may be disposed at the same height as the lowest column of the cooling pipe 331 or at a position lower than the lowest column of the cooling pipe 331.

This embodiment shows that the heater case 371*a* is located at a position lower than the lowest column of the cooling pipe 331 at the one side of the evaporator 330 where the accumulator 334 is located, in a horizontal direction (that is, a left-right direction) to be in parallel with the cooling pipe 331.

The heater 371*b* for heating the working fluid F in the inner flow path 371*a*1 is mounted in the heater receiving part 371*a*2F. The heater 371*b* is configured to generate heat when power is supplied, and the working fluid F in the inner flow path 371*a*1 is heated to a high temperature by receiving the heat generated from the heater 371*b*.

The heater 371*b* may have a form extended along the extending direction of the heater receiving part 371*a*2. The heater 371*b* may have a shape of a flat plate having a predetermined thickness.

This embodiment shows that the heater receiving part 371*a*2 is formed below the inner flow path 371*a*. In this way, the structure in which the heater 371*b* is disposed below the heater case 371*a* is advantageous for making the heated working fluid F have a thrust upward.

In a state where the heater 371*b* is inserted into the heater receiving part 371*a*2, one surface of the heater case 371*a* defining the heater receiving part 371*a*2 is pressed by a pressing member (not shown). The pressing is performed in a direction from the heater receiving part 371*a*2 toward the inner flow path 371*a*1. By the pressing, a pressed portion 371*a*' recessed toward the heater receiving part 371*a*2 is formed in the heater case 371*a*.

The heater 371*b* is pressed by the pressed portion 371*a*' so as to be brought into close contact with an inner surface of the heater receiving part 371*a*2. In FIGS. 5 and 6, the pressed portion 371*a*' is formed on a bottom surface of the heater case 371*a*. The pressed portion 371*a*' has a recessed form in a direction from the heater receiving part 371*a*2 toward the inner flow path 371*a*1. Therefore, the heater 371*b* is pressed by the pressed portion 371*a*', so as to be brought into close contact with an upper inner surface and a lower inner surface of the heater receiving part 371*a*2.

By the above structure, the heater 371*b* may be firmly fixed in the heater receiving part 371*a*2. In addition, since the heater 371*b* is closely adhered to the upper inner surface of the heater receiving part 371*a*2 that divides the inner flow path 371*a*1 and the heater receiving part 371*a*2, more heat generated by the heater 371*b* may be transferred to the inner flow path 371*a*1 and used to heat the working fluid F.

In a state where the heater 371*b* is mounted (accommodated and fixed) in the heater receiving part 371*a*2, a sealing member 371*a*4 may be filled in the heater receiving part 371*a*2 to seal the heater 371*b*. The sealing member 371*a*4 is filled in an empty space where the heater 371*b* is not disposed.

As shown, the sealing member 371*a*4 may be filled in gaps between the left and right inner surfaces of the heater receiving part 371*a*2 and left and right side surfaces of the heater 371*b*. In addition, the sealing member 371*a*4 may be disposed to cover the front and rear surfaces of the heater 371*b*.

Silicone, urethane, epoxy, or the like may be used as the sealing member 371*a*4. For example, after a liquid epoxy is filled in the empty space and then cured, the sealing structure of the heater 371*b* may be completed.

Turn-on and turn-off of the heater 371*b* may be controlled by a time condition, a temperature condition, and the like. For example, the heater 371*b* may be controlled to be turned on by the time condition, and may be controlled to be turned off by the temperature condition.

Specifically, the controller may turn off (OFF) the compressor 360 and supply power to the heater 371*b* when a predetermined time elapses after the compressor 360 constituting a refrigeration cycle with the evaporator 330 is turned on. Therefore, the heater 371*b* receives power and generates heat.

The controller may cut off power supplied to the heater 371*b* when a temperature sensed by a defrost sensor 335 to be described later reaches a preset defrost ending temperature. Since no power is supplied to the heater 371*b*, active heating of the heater 371*b* stops, and the temperature gradually decreases.

As described above, defrosting apparatuses which have been invented before use a fuse to prevent overheating of the heater. However, in the defrosting apparatus 370 of the present disclosure, the heater 371*b* having a characteristic of not generating heat any more as a current is suppressed due to a sharp increase in resistance at a preset temperature or higher is used. That is, the heater 371*b* itself has a function of preventing its overheating. This will be described in detail later.

A defrost sensor 335 for sensing a temperature for defrosting is disposed in the cooling chamber 316 in which the evaporator 330 is disposed. The defrost sensor 335 is installed at a position suitable to represent the temperature of the evaporator 330, and for this purpose, the defrost sensor 335 is preferably located at a position less affected by the temperature rise by the defrosting apparatus 370.

In this embodiment, the defrost sensor 335 is mounted on an upper end portion of the support 333. When the heating unit 371 is disposed to be adjacent to one of the supports 333, the defrost sensor 335 may be mounted on the other support 333 farther from the heating unit 371.

Or, the defrost sensor 335 may be mounted at an inlet side of the cooling pipe 331. The inlet side of the cooling pipe 331 is a portion where the temperature is the lowest in the evaporator 330 and is less affected by the temperature rise by the defrosting apparatus 370. Thus, the inlet side is suitable as another position that represents the temperature of the evaporator 330.

When the temperature sensed by the defrost sensor 335 reaches a preset defrost ending temperature, the controller may cut off power supplied to the heater 371*b*. Since no power is supplied to the heater 371*b*, active heating of the heater 371*b* stops, and the temperature gradually decreases.

On the other hand, as the working fluid F filled in the inner flow path 371*a*1 is heated to a high temperature by the heater 371*b*, the working fluid F flows with directionality by a pressure difference.

Specifically, the working fluid F of a high temperature heated by the heater 371*b* and discharged to the outlet 371*a*1' flows into the heat pipe 372 and transfers heat to the cooling pipe 331 of the evaporator 330 while moving through the heat pipe 372. The working fluid F is gradually cooled by this heat exchange process and flows into the inlet 371*a*1". The cooled working fluid F is reheated by the heater 371*b* and then discharged again to the outlet 371*a*1'. Those processes are repetitively performed. The cooling pipe 331 is defrosted by this circulation method.

Referring to FIGS. 2 and 3, at least a part of the heat pipe 372 is disposed to be adjacent to the cooling pipe 331 of the evaporator 330. Accordingly, heat is transferred to the cooling pipe 331 of the evaporator 330 by the working fluid F of a high temperature which flows after being heated by the heating unit 371, thereby removing frost.

The heat pipe 372 may have a form (zigzag form) that is repeatedly bent like the cooling pipe 331. To this end, the heat pipe 372 includes an extending portion 372*a* and a heat dissipating portion 372*b*.

The extending portion 372*a* forms a flow path for transferring the working fluid F heated by the heating unit 371 to the upper side of the evaporator 330. The extending portion 372*a* is connected to the outlet 371*a*1' of the heater case 371*a* provided at a lower part of the evaporator 330 and the heat dissipating portion 372*b* provided at an upper part of the evaporator 330.

The extending portion 372*a* includes a vertical extending portion extending towards to the upper part of the evaporator 330. The vertical extending portion extends up to the upper part of the evaporator 330 with being spaced apart from the support 333, at the outside of the support 333 which is provided at one side of the evaporator 330.

Meanwhile, the extending portion 372*a* may further include a horizontal extending portion according to an installation position of the heating unit 371. For example, when the heating unit 371 is provided at a position spaced apart from the vertical extending portion, the horizontal extending portion for connecting the heating unit 371 and the vertical extending portion may be further provided.

When the horizontal extending portion is connected to the heating unit 371 and extends long, the working fluid F of high temperature passes through the lower part of the evaporator 330. Therefore, the cooling pipe 331 disposed at the lower part of the evaporator 330 can be defrosted smoothly.

The heat dissipating portion 372*b* is connected to the extending portion 372*a* extending to the upper part of the evaporator 330 and extends in a zigzag form along the cooling pipe 331 of the evaporator 330. The heat dissipating portion 372*b* is configured by a combination of a plurality of horizontal pipes 372*b*' (see FIG. 12) forming columns in an up-down direction, and connection pipes 372*b*" formed in a U-shape that is bent to connect the horizontal pipes 372*b*' in a zigzag form.

The extending portion 372*a* or the heat dissipating portion 372*b* may extend up to a position adjacent to the accumulator 334 to remove frost accumulated on the accumulator 334.

As illustrated, when the vertical extending portion is disposed at one side of the evaporator 330 where the accumulator 334 is located at, the vertical extending portion may extend upwards to a position adjacent to the accumulator 334, and be bent downwards to the cooling pipe, then extend to be connected to the heat dissipating portion 372*b*.

On the other hand, when the vertical extending portion is disposed at the another side that is opposite to the one side of the evaporator 330, the heat dissipating portion 372*b* may be connected to the vertical extending portion, extended horizontally, and extend upwards to the accumulator 334, then extend downwards to correspond to the cooling pipe 331.

In the heat pipe 372, one end portion inserted into the heater case 371*a* through the outlet 371*a*1' constitutes the introduction portion 372*c*', 372*c*" into which the working fluid F of high temperature is introduced, and the another end portion inserted into the heater case 371*a* through the inlet 371*a*1" constitutes return portion 372*d*', 372*d*" through which the cooled working fluid F is collected back.

In this embodiment, a circulation flow path for the working fluid F is formed such that the working fluid F heated by the heater 371*b* flows into the introduction portion 372*c*', 372*c*" to be transferred to the upper part of the evaporator 330 through the extending portion 372*a*, transfers heat to the cooling pipe 331 while flowing along the heat dissipating portion 372*b* so as to perform defrosting, and is returned to the heater case 371*a* through the return portion 372*d*', 372*d*", then is reheated by the heater 371*b* so as to flow along the heat pipe 372.

In a structure in which the heat pipe 372 is configured by first and second heat pipes 372' and 372" forming two rows, the first and second heat pipes 372' and 372" are connected to the outlet 371*a*1' and the inlet 371*a*1" of the inner flow path 371*a*1, respectively.

The inner flow path 371*a*1 may be formed to accommodate the first and second heat pipes 372' and 372" at once. To this end, the inner flow path 371*a*1 has the one outlet 371*a*1' and the one inlet 371*a*1" into which the first and second heat pipes 372' and 372" are inserted.

As shown, the outlet 371*a*1' and the inlet 371*a*1" may have a shape of a long hole. The outlet 371*a*1' and the inlet 371a1" may have a shape corresponding to a portion of an exterior shape of the first and second heat pipes 372' and 372".

As such, the structure that the first and second heat pipes 372' and 372" are inserted into the one outlet 371a1' and the one inlet 371a1" at once may have an advantage of reducing welding points (portions) between the heater case 371a and the first and second heat pipes 372' and 372". This will be described in detail later.

On the other hand, by the connection structure, the working fluid F in a gas state heated by the heating unit 371 is discharged to the first and second heat pipes 372' and 372" through the outlet 371a1', respectively. One end portion of the first and second heat pipes 372', 372" inserted into the heater case 371a through the outlet 371a1' may be construed as first and second introduction portions 372c', 372c" (where the working fluid F of high temperature heated by the heater 371b is introduced) in view of their functions. The first and second introduction portions 372c' and 372c" are arranged in parallel and are respectively inserted into the single outlet 371a1' having the shape of the long hole.

Also, the working fluid F in a liquid state cooled while moving through the first and second heat pipes 372' and 372" flows into the heater case 371a through the inlet 371a1". The another end portions of the first and second heat pipes 372' and 372" inserted into the heater case 371a through the inlet 371a1" may be construed as first and second return portions 372d' and 372d" (where the working fluid F in the liquid state cooled while moving through each of the heat pipe 372 is collected back) in view of their functions. The first and second return portions 372d' and 372d" are arranged in parallel and are respectively inserted into the single inlet 371a1" having the shape of the long hole.

For reference, the heat pipe 372 is configured by the first and second heat pipes 372' and 372" forming two rows in this embodiment, but the present disclosure is not limited thereto. The heat pipe 372 may alternatively be formed in a single row.

The heater case 371a is provided with a working fluid injection hole 371a3 for injecting the working fluid F into the inner flow path 371a1. The working fluid F injected through the working fluid injection hole 371a3 is filled in the inner flow path 371a1 of the heater case 371a, and then filled up by a predetermined amount in the heat pipe 372.

The working fluid injection hole 371a3 is formed to communicate with the inner flow path 371a1 through one surface of the heater case 371a. The drawing illustrates that the working fluid injection hole 371a3 is formed to penetrate inward through one side surface of the heater case 371a so as to communicate with the inner flow path 371a1.

In order to inject the working fluid F, a working fluid injection pipe 373 is connected to the working fluid injection hole 371a3. The working fluid injection pipe 373 may be inserted into the working fluid injection hole 371a3 and then fixed to the heater case 371a by welding a gap between the working fluid injection hole 371a3 and the working fluid injection pipe 373. After the working fluid F is filled through the working fluid injection pipe 373, the working fluid injection pipe 373 is sealed.

Figure 7:
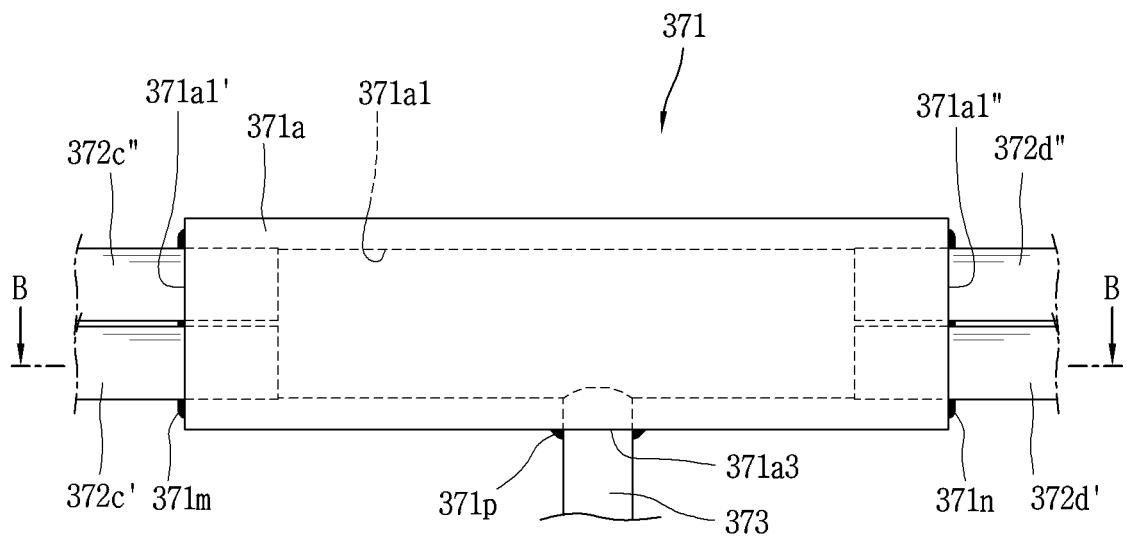
FIG. 7 is a conceptual view illustrating a connection structure between a heater case and a heat pipe illustrated in FIG. 1.

FIG. 7 is a conceptual view illustrating a connection structure between the heater case 371a and the heat pipe 372 illustrated in FIG. 1.

Referring to FIG. 7, the introduction portion 372c', 372c" of the heat pipe 372 is inserted into the inner flow path 371a1 formed inside the heater case 371a through the outlet 371a1', and the return portion 372d', 372d" of the heat pipe 372 is inserted into the inner flow path 371a1 through the inlet 371a1". The introduction portion 372c', 372c" and the return portion 372d', 372d" of the heat pipe 372 may be disposed to face each other with the inner flow path 371a1 interposed therebetween.

The gap between the heat pipe 372 and the heater case 371a may be filled by welding. Specifically, a first welding portion 371m is formed to fill a gap between the introduction portion 372c', 372c" and the outlet 371a1', and a second welding portion 371n is formed to fill a gap between the return portion 372d', 372d" and the inlet 371a1".

As illustrated, when the first and second introduction portions 372c' and 372c" are inserted into the outlet 371a1' with being arranged in parallel, the first welding portion 371m is formed to fill a gap between the first introduction portion 372c' and the outlet 371a1', and a gap between the second introduction portion 372c" and the outlet 371a1' together. Therefore, the first and second introduction portions 372c' and 372c" may be fixed to the heater case 371a by being welded at once.

Likewise, when the first and second return portions 372d' and 372d" are inserted into the inlet 371a1" with being arranged in parallel, the second welding portion 371n is formed to fill both a gap between the first return portion 372d' and the inlet 371a1", and a gap between the second return portion 372d" and the inlet 371a1" together. Therefore, the first and second return portions 372d' and 372d" may be fixed to the heater case 371a by being welded at once.

As such, when welding the gaps between the first and second introduction portions 372c' and 372c" formed in parallel and the outlet 371a1' at once, and welding the gaps between the first and second return portions 372d' and 372d" formed in parallel and the inlet 371a1" at once, the amount of welding points can be further reduced, thereby reducing the production cost.

On the other hand, the working fluid injection hole 371a3 is formed to be connected with the inner flow path 371a1 located between the first and second introduction portions 372c' and 372c" and the first and second return portions 372d' and 372d". Further, in a state where the working fluid injection pipe 373 is inserted into the working fluid injection hole 371a3, a third welding portion 371p is formed to fill a gap between the working fluid injection hole 371a3 and the working fluid injection pipe 373.

Figure 8:
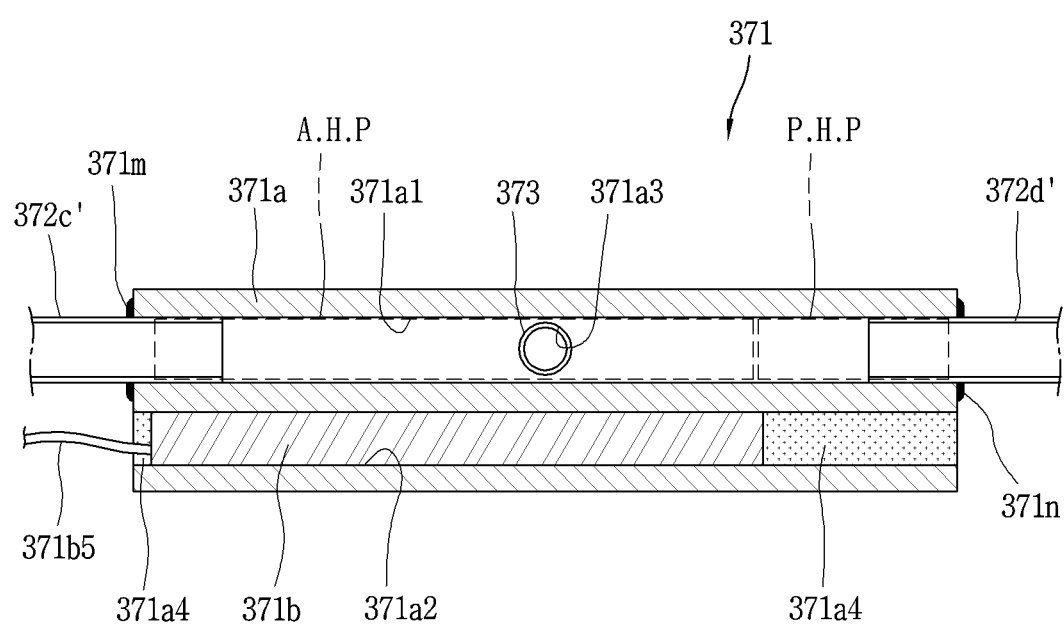
FIG. 8 is a sectional view illustrating the heating unit illustrated in FIG. 7, taken along the line B-B.

FIG. 8 is a sectional view illustrating the heating unit 371 illustrated in FIG. 7, taken along the line B-B.

As illustrated in FIG. 8, the heater case 371a is partitioned into an active heating part (AHP) corresponding to a portion where the heater 371b is disposed, and a passive heating part (PHP) corresponding to a portion where the heater 371b is not disposed.

The heater 371b is disposed in a portion of the heater receiving part 371a2 corresponding to the active heating part (AHP) (a lower side of the active heating part on the drawing), and the sealing member 371a4 is disposed in a portion corresponding to the passive heating part (PHP) (a lower side of the passive heating part on the drawing).

The active heating part (AHP) is a portion directly heated by the heater 371b, and the working fluid F in a liquid state is heated in the active heating part (AHP) then changes its phase to a gas state of a high temperature.

The introduction portions 372c' and 372c" of the heat pipe 372 may be located in the active heating part (AHP), or at the front of the active heating part (AHP) (based on the flow direction of the working fluid F). FIG. 8 exemplarily illustrates that the heater 371b is formed to extend forwardly, passing below the introduction portions 372c' and 372c".

That is, in this embodiment, the introduction portions 372c' and 372c" of the heat pipe 372 are located in the active heating part (AHP).

The passive heating part (PHP) is formed at the rear of the active heating part (AHP) (a direction opposite to the flow direction of the working fluid F). The passive heating part (PHP) is not directly heated by the heater 371b like the active heating part (AHP), but indirectly receives heat and is heated to a preset temperature level. Here, the passive heating part (PHP) may cause a predetermined temperature rise in the working fluid F in the liquid state, but does not have a high temperature enough to change the phase of the working fluid F to the gas state. That is, in terms of temperature, the active heating part (AHP) forms a relatively high temperature portion, and the passive heating part (PHP) forms a relatively low temperature portion.

When the working fluid F is made to return directly toward the high temperature active heating part (AHP), the working fluid F being collected may be heated again and flow backwards without smoothly returning into the heater case 371a. This may interfere with the circulation flow of the working fluid F in the heat pipe 372, which may cause a problem that the heater 371b is overheated.

In order to remedy this problem, the return portions 372d' and 372d" of the heat pipe 372 inserted into the inlet 371a1" are configured to be in communication with the passive heating part (PHP), so that the working fluid F returned after moving through the heat pipe 372 does not directly flow into the active heating part (AHP).

Figure 9:
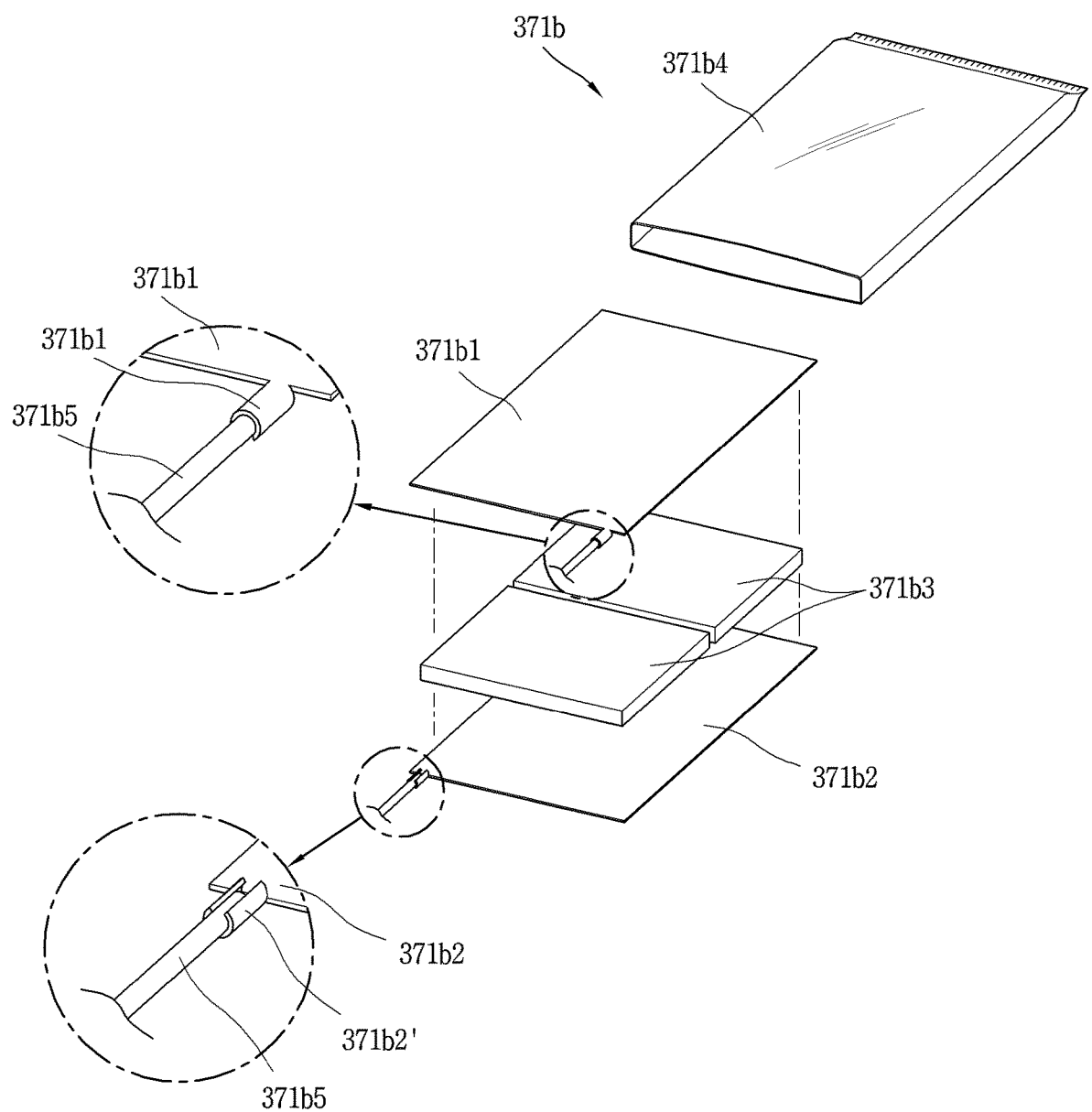
FIG. 9 is an exploded perspective view illustrating one example of a heater illustrated in FIG. 4.

FIG. 9 is an exploded perspective view illustrating one example of the heater illustrated in FIG. 4.

As described above, the heater 371b does not generate heat any more at a preset temperature or higher because a current is suppressed due to a sharp increase in resistance. For example, in order to ensure the safety of the defrosting apparatus 370, the heater 371b may be configured to no longer generate heat when it reaches 280° C.

As such, the heater 371b has a limited temperature of heat to be generated by its own characteristic. Therefore, there is an advantage in that the safety of the heater 371b can be secured without using a fuse as a safety device provided in the related art heating unit.

Referring to FIG. 9, the heater 371b may include first and second electrode plates 371b1 and 371b2, and a Positive Temperature Coefficient (PTC) thermistor 371b3.

The first and second electrode plates 371b1 and 371b2 are disposed to face each other at a predetermined interval. The first and second electrode plates 371b1 and 371b2 are formed of a metal material (for example, aluminum material).

Each of the first and second electrode plates 371b1 and 371b2 is electrically connected to a power supply unit (not shown) through a lead wire 371b5. In order to connect the lead wire 371b5 to the first and second electrode plates 371b1 and 371b2, the first and second electrode plates 371b1 and 371b2 may be provided with clamping parts 371b1' and 371b2', respectively, which surround and fix the lead wires 371b5.

The PTC thermistor 371b3 is interposed between the first electrode plate 371b1 and the second electrode plate 371b2. The PTC thermistor 371b3 has a characteristic that resistance increases as temperature rises. The PTC thermistor 371b3 is formed of barium titanate-based ceramics obtained by mixing a small amount (0.1% to 1.5%) of oxides such as lanthanum, yttrium, bismuth, and thorium with barium titanate and plasticizing the mixture.

The PTC thermistor 371b3 has a relatively small resistance value at a low temperature, but has a characteristic of drastic increase in resistance when it reaches a predetermined temperature. Therefore, current is suppressed at or above the predetermined temperature.

The temperature at which the temperature-resistance characteristic of the PTC thermistor 371b3 changes rapidly is called Curie Point or Curie Temperature. The Curie point may be moved to a high temperature side or to a low temperature side by controlling components of the PTC thermistor 371b3. Therefore, the heater 371b that generates sufficient heat for defrosting but is restricted from generating heat at the predetermined temperature or higher can be manufactured by adjusting the components of the PTC thermistor 371b3.

The method of adjusting the Curie point is as follows. When part of barium is replaced with lead, the Curie point moves toward higher temperature. When barium is replaced with strontium or part of titanium is replaced with tin or zirconium, the Curie point moves toward lower temperature. In this manner, the PTC thermistor 371b3 having a heat generation characteristic suitable for use as a defrost heater 371b may be manufactured.

The PTC thermistor 371b3 may be provided in plurality. For example, as illustrated, two PTC thermistors 371b3 of xW (watts) may be disposed along one direction to form a 2×W (watts) heater 371b.

The PTC thermistor 371b3 is tightly attached to the first and second electrode plates 371b1 and 371b2, respectively. A resistance paste (for example, Ag paste) may be applied to both surfaces of the PTC thermistor 371b3 contacting the first and second electrode plates 371b1 and 371b2, respectively.

On the other hand, the heater 371b may further include an insulating film 371b4 formed to surround the first and second electrode plates 371b1 and 371b2. As illustrated, the insulating film 371b4 may be configured to accommodate the first and second electrode plates 371b1 and 371b2 having the PTC thermistor 371b3 interposed therebetween.

Hereinafter, the characteristics of the PTC thermistor 371b3 will be described in more detail.

Figure 10:
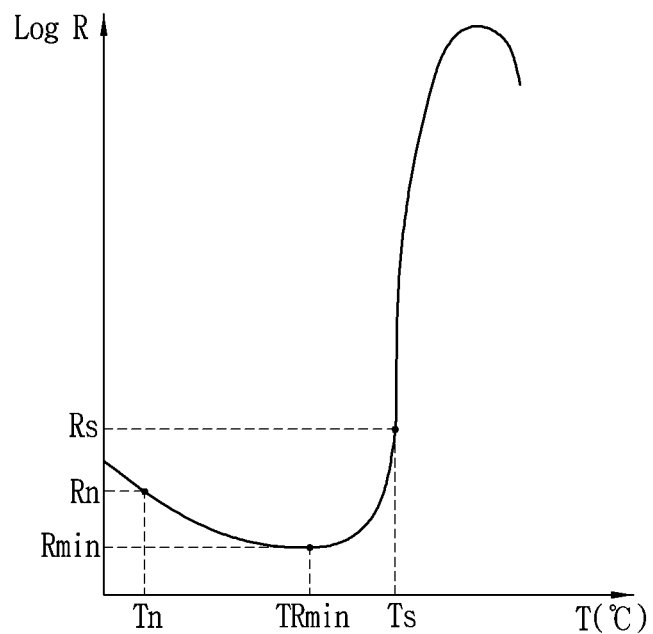
FIG. 10 is a graph showing a resistance-temperature characteristic of a PTC thermistor illustrated in FIG. 9.

FIG. 10 is a graph showing the resistance-temperature characteristics of the PTC thermistor 371b3 illustrated in FIG. 9.

When the resistance according to the temperature change of the PTC thermistor 371b3 is measured, the resistance-temperature characteristic as shown in FIG. 10 is obtained. The PTC thermistor 371b3 shows a characteristic of a sudden increase in resistance when reached to the Curie point.

The Curie point at which the temperature-resistance characteristic of the PTC thermistor 371b3 changes abruptly is generally defined as a temperature corresponding to twice the minimum resistance value Rmin or a temperature corresponding to twice the resistance value Rn at a reference temperature (Tn, room temperature, 25° C.).

In the graph, Tmin is a temperature for the minimum resistance value Rmin, Ts is the Curie point (switching temperature) at which the resistance value increases rapidly, and Rs is the resistance value at the Curie point.

Figure 11:
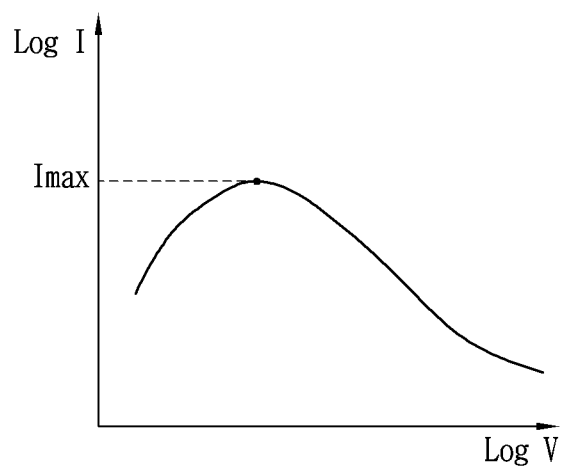
FIG. 11 is a graph showing a current-voltage characteristic of the PTC thermistor illustrated in FIG. 9.

FIG. 11 is a graph showing the current-voltage characteristics of the PTC thermistor 371b3 illustrated in FIG. 9.

When voltage is gradually increased by applying it to the PTC thermistor 371b3, the temperature of the PTC thermistor 371b3 rises due to self-heating as shown in FIG. 11. When the temperature rises above the Curie point, the resistance increases due to the resistance-temperature characteristic described above, and thus the current decreases. By using this characteristic, the PTC thermistor 371b3 may be used as the heater 371b having a constant temperature heating function and an overcurrent protection function.

When viewing the voltage and the current on a log scale, an electrostatic characteristic is shown at a part where the current decreases. This characteristic has an advantage that the PTC thermistor 371b3 does not require a separate control circuit.

Due to the characteristic of the PTC thermistor 371b3 described above, the PTC thermistor 371b3 stays in a low resistance region during normal operation and serves as a general fixed resistance, but after it exceeds the Curie point by self-heating, the current is suppressed and any more overheating is prevented. Therefore, problems such as shortening of the life of the heater due to overheating and deterioration of the efficiency of the evaporator can be solved. In addition, unlike a fuse in which an internal configuration melts down when temperature exceeds a preset temperature and does not function any more, the heater 371b using the PTC thermistor 371b has a characteristic of preventing overheating itself, it is advantageous in terms of maintenance of the defrosting apparatus 370.

Figure 12:
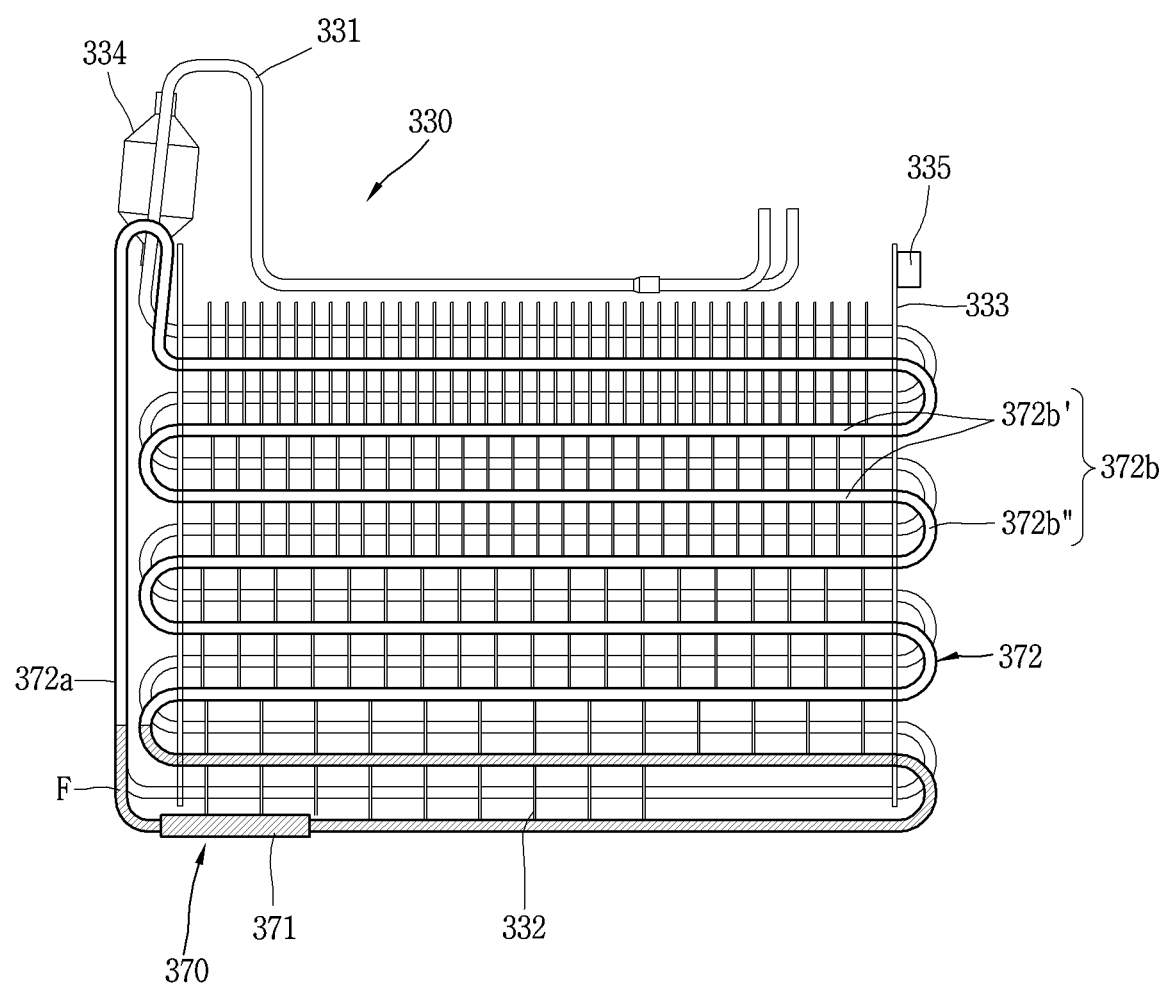
FIGS. 12 and 13 are conceptual views illustrating a circulation of a working fluid in states before and after an operation of a heater.
Figure 13:
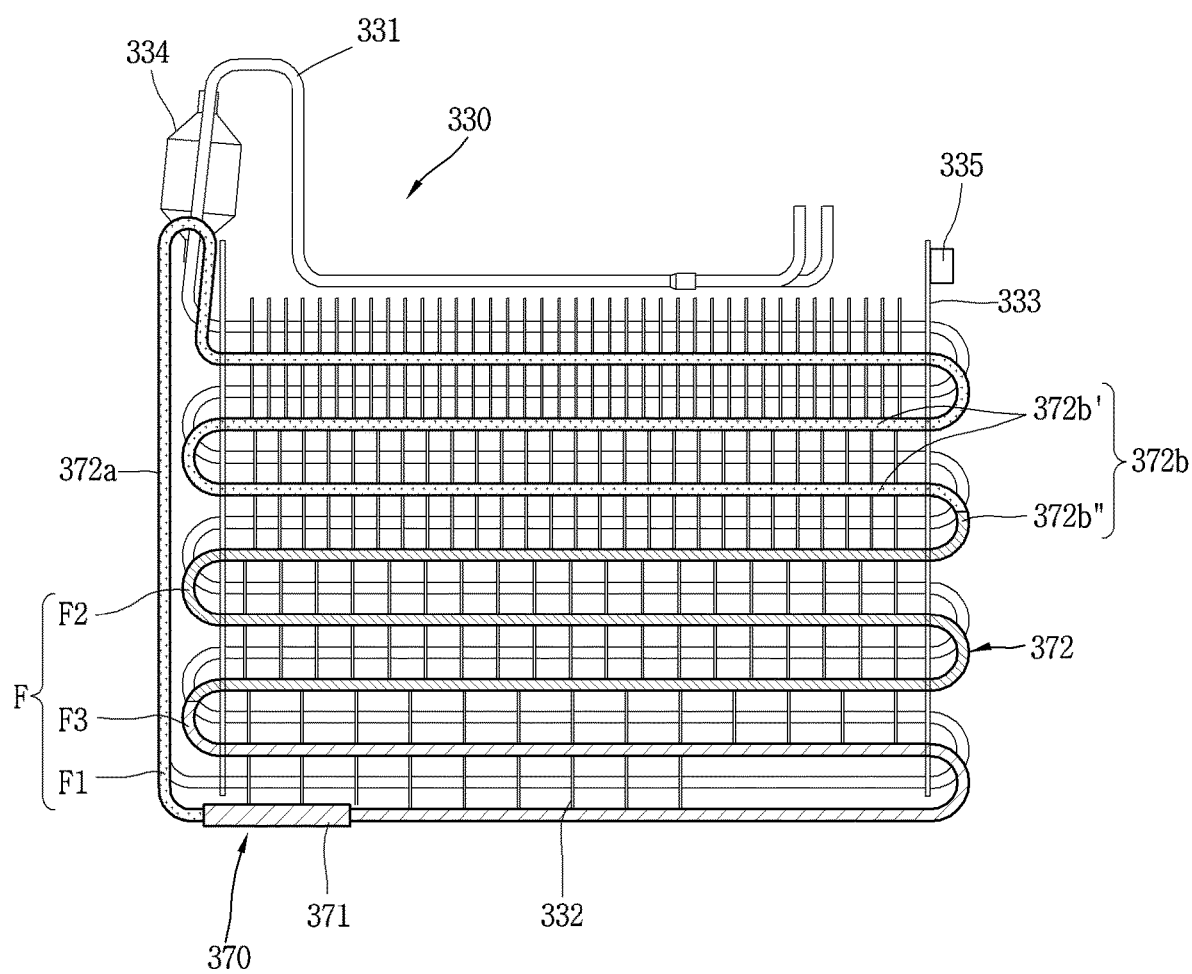

FIGS. 12 and 13 are conceptual views illustrating the circulation of the working fluid F in states before and after the operation of the heater 371b.

First, referring to FIG. 12, the working fluid F is in a liquid state before the heater 371b operates, and is filled up by a predetermined upper column of the heat pipe 372 based on the lowermost column of the heat pipe 372. As an example, in this state, the working fluid F may be filled up to the second column of the lower part of the heat pipe 372.

When the heater 371b operates, the working fluid F in the heater case 371a is heated by the heater 371b. Referring to FIG. 13, the working fluid F heated to a high-temperature gas state F1 flows into the introduction portions 372c' and 372c" of the heat pipe 372 and the heat thereof is dissipated in the cooling pipe 331. The working fluid F flows in a state where liquid and gas coexist F2 as losing heat during the heat dissipation process, and finally, flows into the heating unit 371 through the return portions 372d' and 372d" of the heat pipe 372 in a liquid state F3. The working fluid F flowed into the heating unit 371 is reheated by the heater 371b to repeat (circulate) the flow same as described above, and during this process, heat is transferred to the evaporator 330 to remove frost accumulated on the evaporator 330.

As such, the working fluid F flows due to the difference in pressure occurred by the heating unit 371 and rapidly circulates along the heat pipe 372. Thus, the entire section of the heat pipe 372 reaches a stable operating temperature within a short time, so that a defrosting operation can be done quickly.

On the other hand, the working fluid F flowing into the introduction portions 372c' and 372c" has the highest temperature during the circulation process of the heat pipe 372 in the high-temperature gas state F1. Therefore, by using convection of heat by the working fluid F in the high-temperature gas state F1, frost accumulated on the evaporator 330 can be removed more efficiently.

For example, the introduction portions 372c' and 372c" may be disposed at a position which is relatively lower than or the same position as the lowest column of the cooling pipe 331 provided in the evaporator 330. According to this, the working fluid F of high temperature introduced through the introduction portions 372c' and 372c" can transfers heat near the lowest column of the cooling pipe 331, and also the heat can go up to be transferred to the cooling pipe adjacent to the lowest column.

On the other hand, in order for the working fluid F to circulate the heat pipe 372 with such phase change, the working fluid F must be filled in the heat pipe 372 with an appropriate amount.

In the result of an experiment, it has been checked that when the working fluid F is filled up lower than 30% of the total internal volume of the heat pipe 372 and the heater case 371a, the temperature of the heating unit 371 suddenly rises according to a lapse of time. This means that the working fluid F is insufficient in relation to the total internal volume of the heat pipe 372 and the heater case 371a.

In addition, it has been checked that the temperature of several columns of the heat pipe 372 fails to reach a stable operating temperature [40° C.~50° C. (−21° C. freezing condition)] when the working fluid F is filled up exceeding 40% of the total internal volume of the heat pipe 372 and the heater case 371a. This temperature drop is more prominent as the heat pipe 372 gets closer to the return portions 372d' and 372d". This may be understood as the amount of working fluid F is excessive in relation to the total volume of the heat pipe 372 and the heater case 371a, and thus sections in which the working fluid F flows in a liquid state are increased.

It has been checked that when the working fluid F is filled up by more than 30% and less than 40% in relation to the total internal volume of the heat pipe 372 and the heater case 371a, the temperature of the respective columns of the heating unit 371 and the heat pipe 372 reaches to a stable operating temperature.

At this time, each column of the heat pipe 372 shows a higher temperature as it is closer to the introduction portions 372c' and 372c", and shows a lower temperature as it is closer to the return portions 372d' and 372d". As the amount of the filled working fluid F decreases, the difference between the temperature at the introduction portions 372c' and 372c" (the highest temperature) and the temperature at the return portions 372d' and 372d" (the lowest temperature) also decreases.

Therefore, the working fluid F is filled up by more than 30% and less than 40% with respect to the total internal volume of the heat pipe 372 and the heater case 371a, but the filling amount of the working fluid F optimized for each defrosting apparatus 370 may be selected according to the heat transferring structure, stability, etc. of the defrosting apparatus 370.

Hereinafter, other embodiments of the heating unit 371 illustrated in FIG. 3 will be described. For reference, in order to reduce duplication or repetition of descriptions, it will be described only for the parts that are structurally different from the first embodiment in the descriptions of the other embodiments. Therefore, descriptions of the heater 371b of the first embodiment may be equally applicable to heaters 471b, 571b, 671b, 771b, 871b, and 971b in the other embodiments which will be described later.

Figure 14:
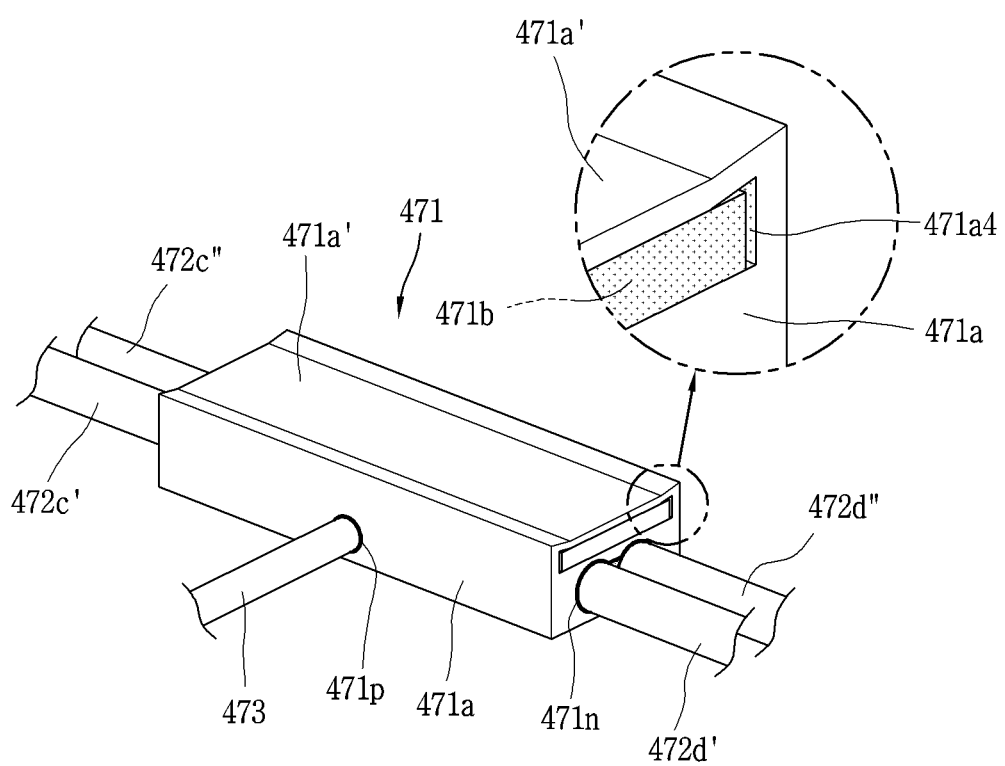
FIG. 14 is a conceptual view illustrating a second embodiment of a heating unit illustrated in FIG. 3.

FIG. 14 is a conceptual view illustrating a second embodiment of the heating unit 371 illustrated in FIG. 3.

As the structure above, when the heater case 371a is disposed in the horizontal direction (i.e., the left-right direction) of the evaporator 330, frost may accumulate on the upper surface of the heater case 371a. When the inner flow path 371a1 is formed just below the upper surface of the heater case 371a, the frost accumulated on the upper surface of the heater case 371a lowers the temperature of the working fluid F in the inner flow path 371a1. Therefore, it may be a factor to reduce the thermal efficiency of the heater 371b.

In order to overcome this, a heating unit 471 in which positions of an inner flow path 471a1 and a heater receiving part 471a2 are reversed may be considered. That is, in the structure in which the heater case 471a is disposed in the horizontal direction (that is, the left-right direction) of the evaporator 430, the heater receiving part 471a2 is formed above the inner flow path 471a. By this arrangement, the heater receiving part 471a2 is formed just below the upper surface of the heater case 471a. That is, the upper surface of the heater case 471a defines the heater receiving part 471a2.

By this arrangement, heat generated in the heater 471b is used not only to heat the working fluid F but also to remove frost accumulated on the heater case 471a. Therefore, the thermal efficiency of the heater 471b can be improved.

Figure 15:
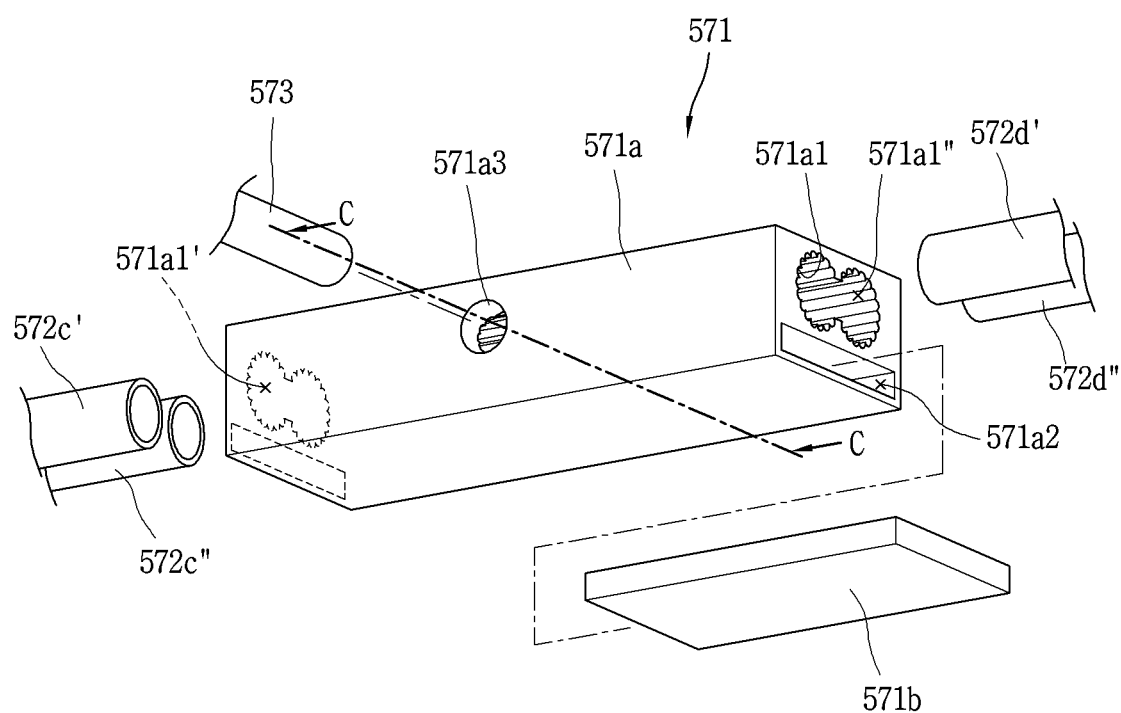
FIG. 15 is a conceptual view illustrating a third embodiment of a heating unit illustrated in FIG. 3.
Figure 16:
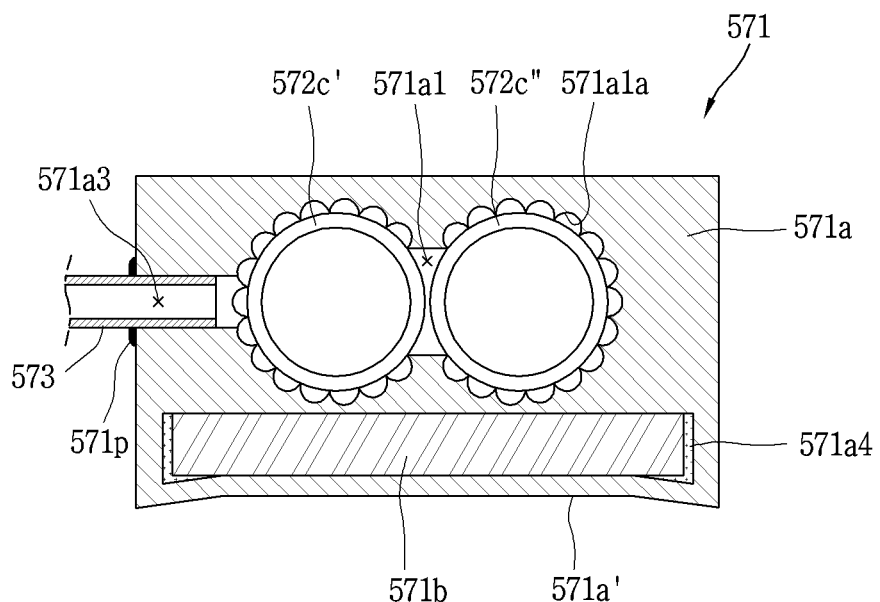
FIG. 16 is a sectional view illustrating a heater case illustrated in FIG. 15, taken along the line C-C.

FIG. 15 is a conceptual view illustrating a third embodiment of the heating unit 371 illustrated in FIG. 3, and FIG. 16 is a sectional view of a heater case 571a illustrated in FIG. 15, taken along the line C-C.

Referring to FIGS. 15 and 16, grooves 571a1a are repeatedly formed along a circumference of an inner flow path 571a1 formed in the heater case 571a. Since the heater case 571a is formed by extrusion molding, the grooves 571a1a are formed to extend along an extrusion molding direction, that is, a lengthwise direction of the heater case 571a, similar to the inner flow path 571a1 and the heater receiving part 571a2.

Since the grooves 571a1a are repeatedly formed along the circumference of the inner flow path 571a1, a heat generation area of the inner flow path 571a1 may be increased. Therefore, an amount of heat transferred to the working fluid F can be increased, and circulation stability of the working fluid F and improvement in defrosting reliability can be accomplished due to an increase in working pressure.

In order to maximize the heat generation area in the inner flow path 571a1, the radius of the groove 571a1a is preferably set as small as possible at a level that may be formed by extrusion molding. For example, the radius of the groove 571a1a may be set to 0.45 mm.

This drawing illustrates that the grooves 571a1a are formed continuously along the circumference of the inner flow path 571a1. Here, the term "continuously" means that another groove 571a1a immediately starts at a point where one groove 571a1a ends.

On the other hand, the grooves 571a1a may be repeatedly formed at constant intervals along the circumference of the inner flow path 571a1.

Figure 17:
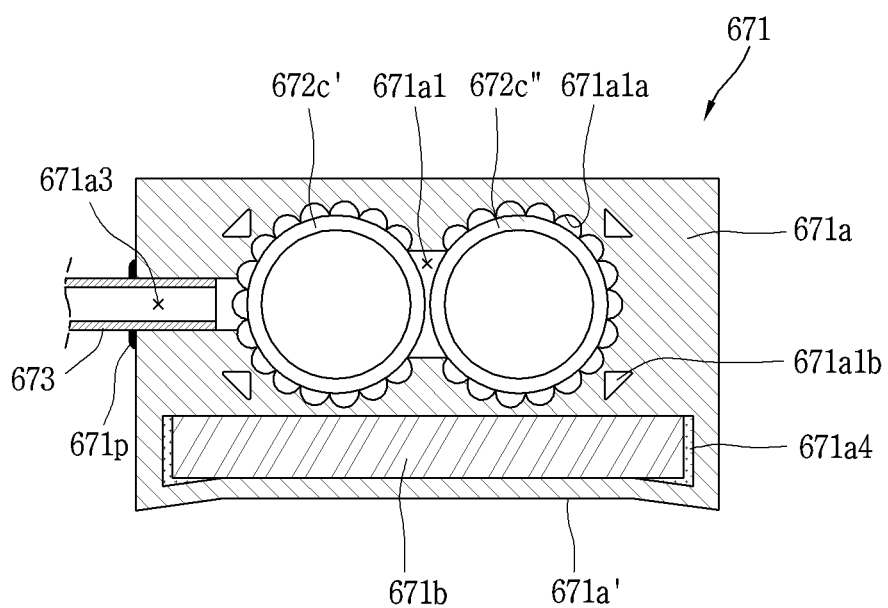
FIG. 17 is a conceptual view illustrating a fourth embodiment of a heating unit illustrated in FIG. 3.

FIG. 17 is a conceptual view showing a fourth embodiment of the heating unit 371 illustrated in FIG. 3.

Referring to FIG. 17, holes 671a1b may be formed around an inner flow path 671a1 and extend in parallel to the inner flow path 671a1 to be open at both ends of a heater case 671a. The holes 671a1b may be located between the inner flow path 671a1 and the corners of the heater case 671a.

Since the heater case 671a is formed by extrusion molding, the holes 671a1b are formed to extend along an extrusion molding direction, that is, a lengthwise direction of the heater case 671a, similar to the inner flow path 671a1 and the heater receiving part 671a2.

The holes 671a1b are formed on paths where heat is discharged around the inner flow path 671a1, so as to limit external discharge of heat in such a way that the discharged heat can be concentrated again in the holes 671a1b. The holes 671a1b may be formed in a sharp shape toward the inner flow path 671a1 so that the heat concentrated in the hole 671a1b may be discharged toward the inner flow path 671a1 again.

As such, since the holes 671a1b are formed, a possibility that the heat transferred to the inner flow path 671a1 is discharged to the outside of the heater case 671a to lead to a heat loss without being used to heat the working fluid may be reduced. As a result, since the holes 671a1b are formed, more heat can be concentrated in the inner flow path 671a1.

This drawing illustrates that the holes 671a1b are additionally formed in the heater case 671a in which the grooves 671a1a are repeatedly formed along the circumference of the inner flow path 671a1 as shown in the third embodiment. However, the present disclosure is not necessarily limited to this example. In addition to the heater cases 371a and 471a of the first and second embodiments described above, the holes 671a1b described later may be further formed in heater cases of other embodiments.

Figure 18:
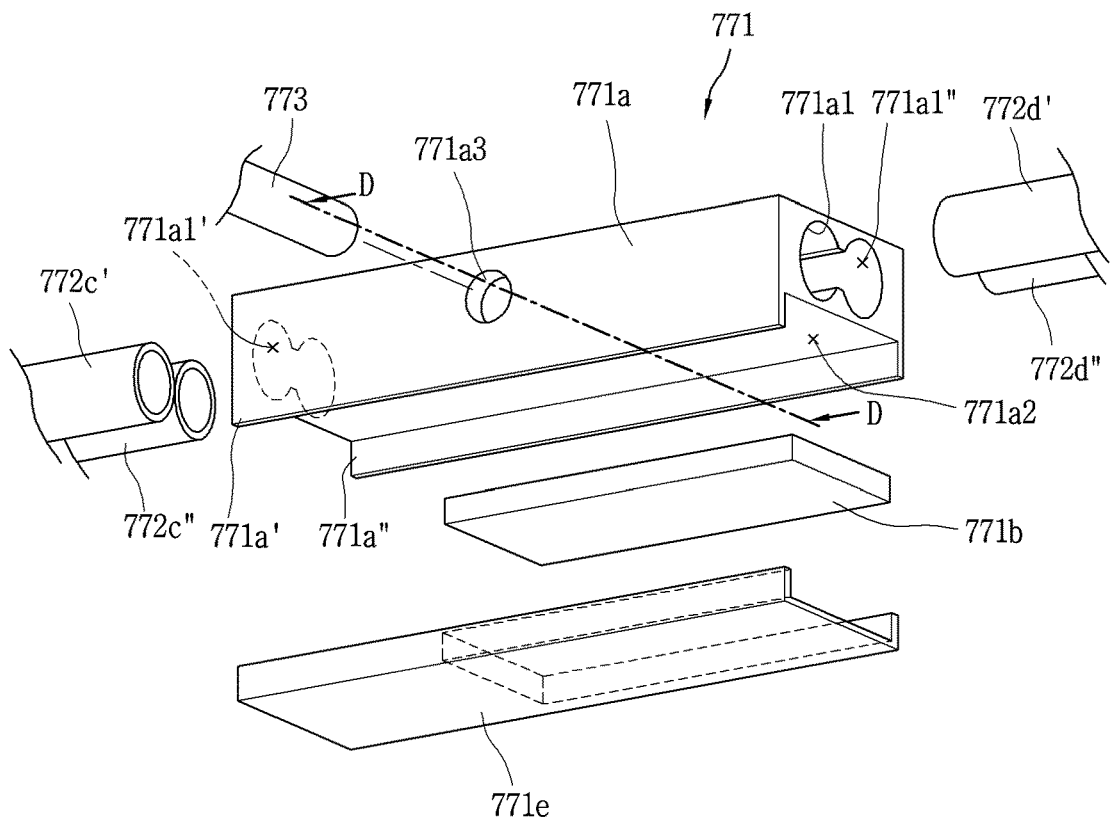
FIG. 18 is a conceptual view illustrating a fifth embodiment of a heating unit illustrated in FIG. 3.
Figure 19:
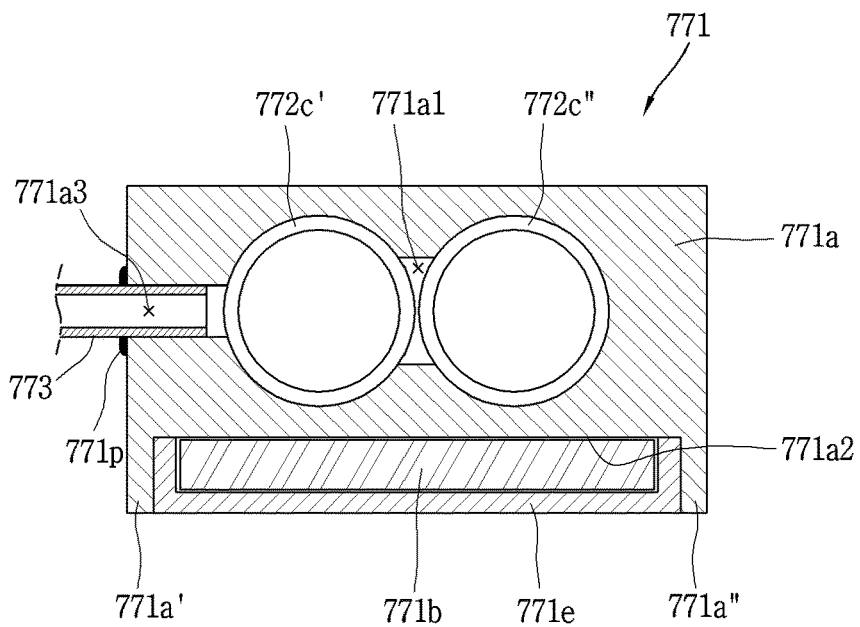
FIG. 19 is a sectional view illustrating a heating unit illustrated in FIG. 18, taken along the line D-D.

FIG. 17 is a conceptual view illustrating a fifth embodiment of the heating unit 371 illustrated in FIG. 3, and FIG. 19 is a sectional view of a heating unit 771 illustrated in FIG. 18, taken along the line D-D.

Referring to FIGS. 18 and 19, first and second extension pins 771a' and 771a" protrude downward from a bottom surface to the heater case 771a at both side of the heater case 771a, respectively. The first and second extension pins 771a' and 771a" may extend along a lengthwise direction of the heater case 771a.

Accordingly, a heater mounting portion 771a2 defined by the first and second extension pins 771a' and 771a" is formed at the lower part of the heater case 771a. The heater mounting portion 771a2 has a shape recessed upward in the lower part of the heater case 771a. Since the heater case 771a is formed by extrusion molding, the heater mounting portion 771a2 is formed to extend along an extrusion molding direction, that is, the lengthwise direction of the heater case 771a, similar to the inner flow path 771a1.

A heater 771b is attached to the bottom surface of the heater case 771a defining the heater mounting portion 771a2. Both side of the heater 771b attached to the bottom surface of the heater case 771a are covered and hidden by the first and second extension pins 771a' and 771a". With the structure, even if defrosted water generated by a defrosting operation falls on the heater case 771a and flows down along side surfaces of the heater case 771a, the defrosted water does not penetrate into the heater 771b accommodated in an inner space between the first and second extension pins 771a' and 771a".

With the heater 771b attached to the heater mounting portion 771a2, a recessed space formed by the first and second extension pins 771a' and 771a" may be filled with a sealing member 771e for sealing the heater 771b. Silicon, urethane, epoxy, or the like may be used as the sealing member 771e. For example, liquid epoxy may be filled in the recessed space to cover the heater 771b, and then cured to complete a sealing structure of the heater 771b. In this case, the first and second extension pins 771a' and 771a" function as sidewalls defining the recessed space in which the sealing member 771e is filled.

For reference, in the above structure, since the heater 771b itself includes an insulating film, a separate insulator for restricting heat transfer to the sealing member 771e is not required between the heater 771b and the sealing member 771e.

Figure 20:
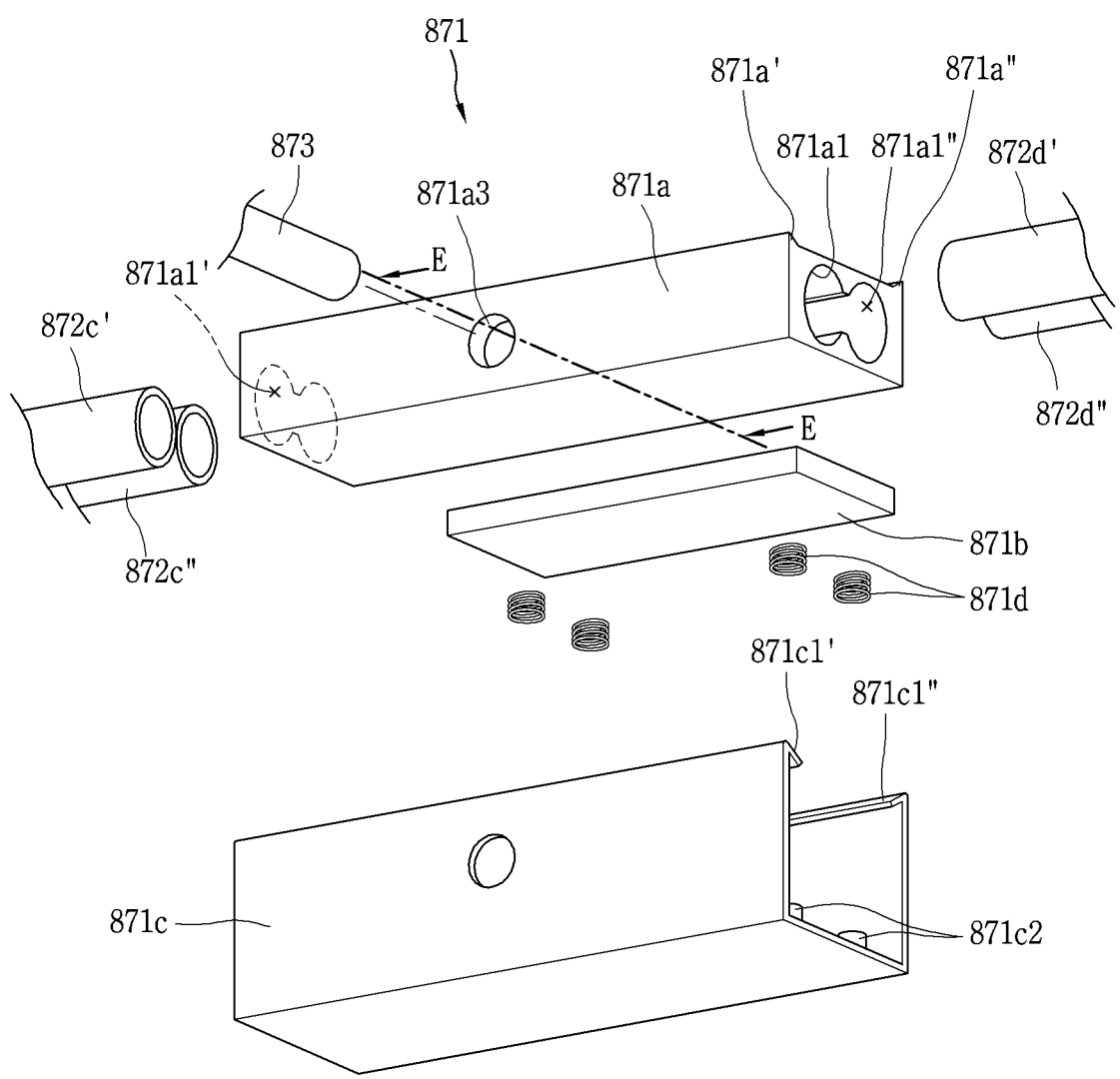
FIG. 20 is a conceptual view illustrating a sixth embodiment of a heating unit illustrated in FIG. 3.

FIG. 20 is a conceptual view illustrating a sixth embodiment of the heating unit 371 illustrated in FIG. 3, and FIG.

21 is a sectional view of the heating unit 871 illustrated in FIG. 20, taken along the line E-E.

Figure 21:
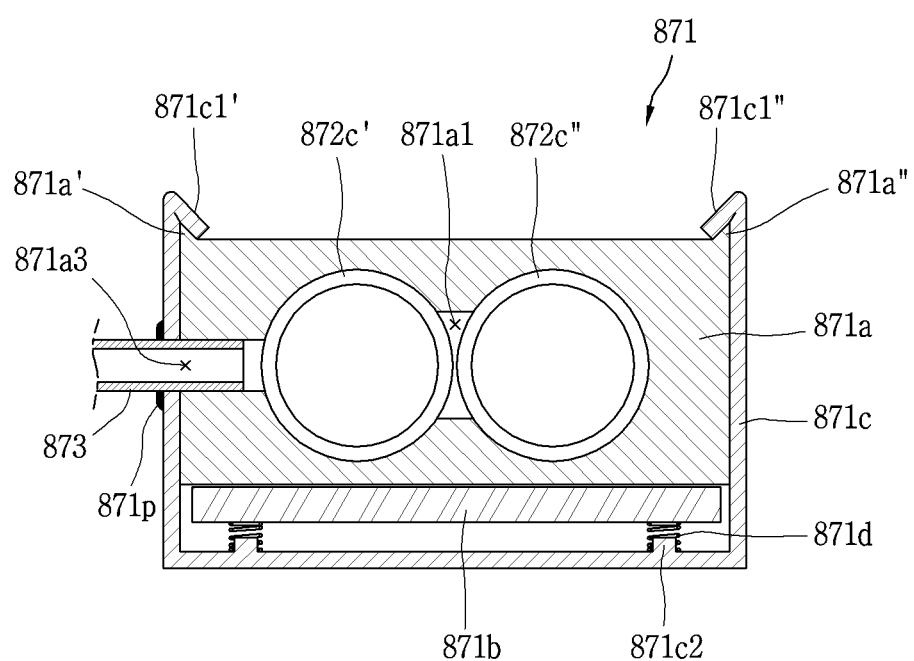
FIG. 21 is a sectional view illustrating the heating unit illustrated in FIG. 20, taken along the line E-E.

Referring to FIGS. 20 and 21, the heating unit 871 includes a heater case 871a, a heater 871b, a holder 871c, and an elastic member 871d.

An inner flow path 871a1 having an inlet 871a1" and an outlet 871a1' in both ends thereof is formed in the heater case 871a. In addition, a working fluid injection hole 871a3 that is in communication with the inner flow path 871a1 for injection of the working fluid F is formed in the heater case 871a.

The heater 871b is attached to the heater case 871a so as to heat the working fluid F in the inner flow path 871a1. This drawing illustrates that the heater 871b is attached to the bottom surface of the heater case 871a. However, the present disclosure is not necessarily limited to this example. The heater 871b may alternatively be attached to a top or side surface of the heater case 871a.

The holder 871c is attached to the heater case 871a and is disposed to cover the heater 871b. The holder 871c may be formed of a synthetic resin material or a metal material which may be elastically deformed to a predetermined level.

The holder 871c may be fixed to the heater case 871a in a hooking manner. To this end, first and second hooks 871c1' and 871c1" may be formed on both side of the holder 871c. The heater case 871a may be provided with locking portions 871a' and 871a" to which the first and second hooks 871c1' and 871c1" are engaged.

This drawing illustrates a structure that the holder 871c is disposed to cover the bottom and both side surfaces of the heater case 871a, and the first and second hooks 871c1' and 871c1" of the holder 871c are hooked respectively to the locking portions 871a' and 871a" provided on the upper side of the heater case 871a.

The elastic member 871d is interposed in a compressed state between the heater 871b and the holder 871c, and is configured to make the heater 871b tightly adhered to the heater case 871a. The elastic member 871d may be provided by at least one in number along a lengthwise direction of the heater 871b. A spring may be used as the elastic member 871d.

A fixing protrusion 871c2 for fixing the elastic member 871d may protrude from the holder 871c. The elastic member 871d may be mounted on the fixing protrusion 871c2 and fixed at a specific position. As illustrated, the fixing protrusion 871c2 may be fitted to the elastic member 871d. That is, the elastic member 871d may be formed to surround the fixing protrusion 871c2.

The structure may allow the heater 871b to be firmly attached to the heater case 871a. As a result, more heat generated in the heater 871b can be transferred to the heater case 871a and be used to heat the working fluid F.

Figure 22:
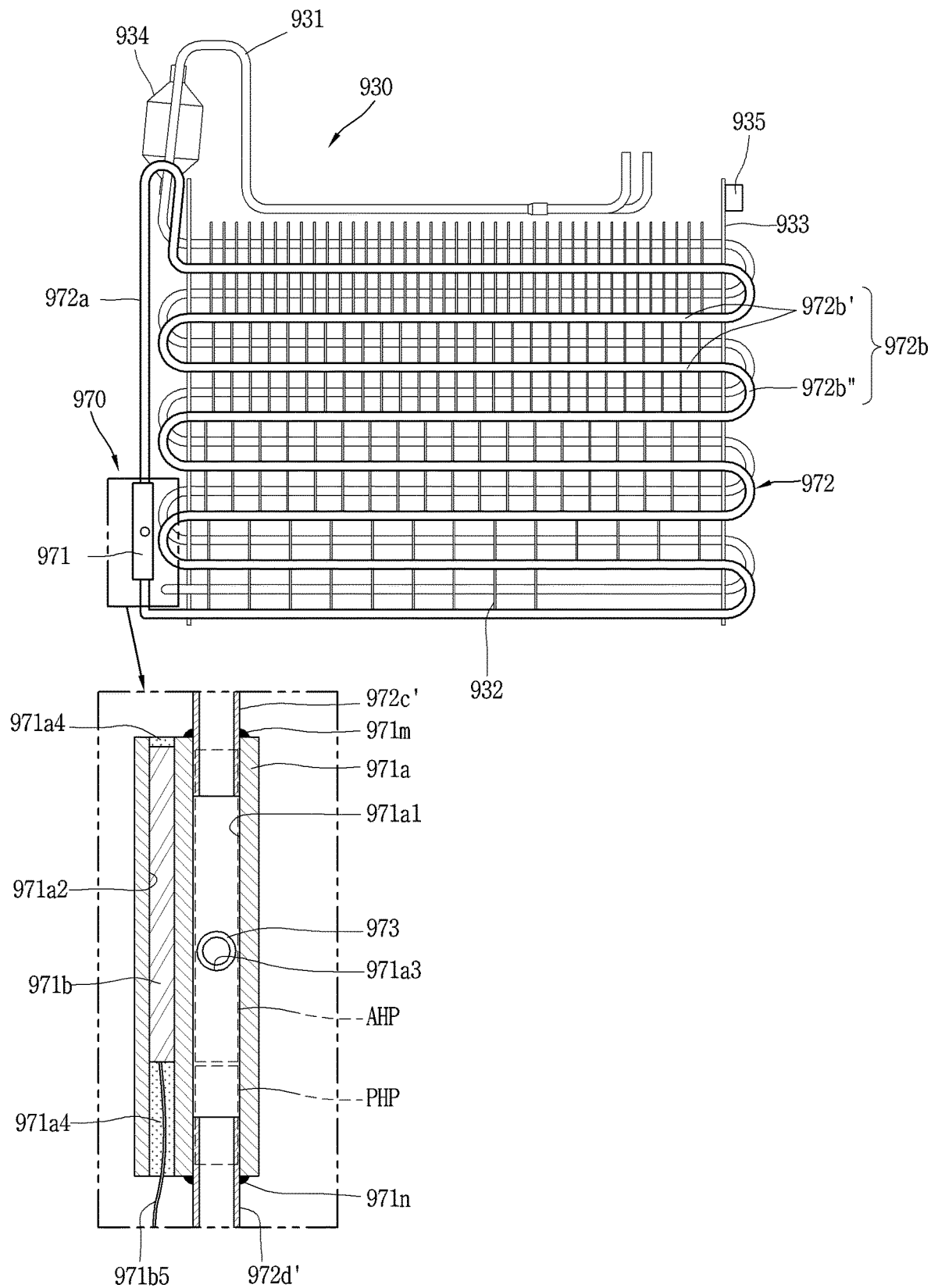
FIGS. 22 and 23 are a planar view and a perspective view illustrating another example of a defrosting apparatus applied to a refrigerator in FIG. 4.
Figure 23:
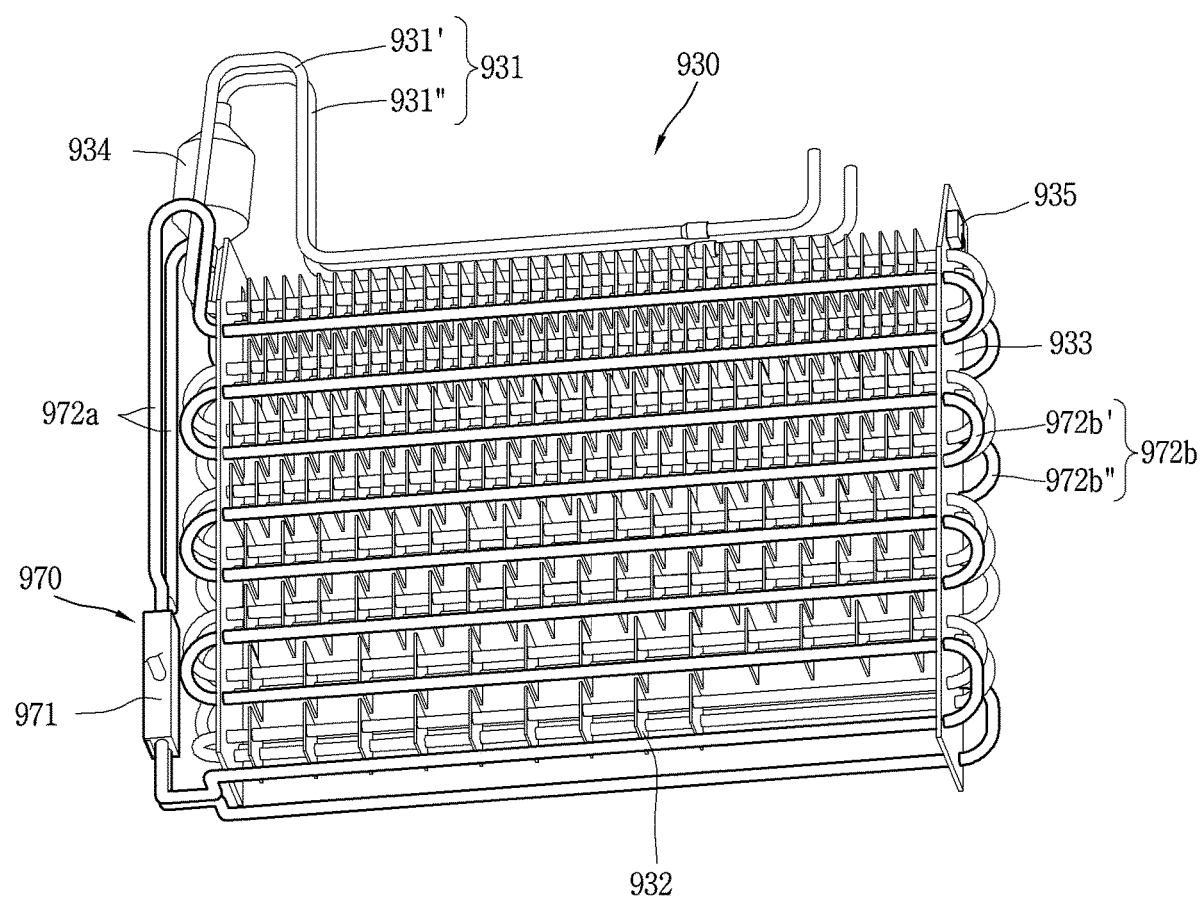

FIGS. 22 and 23 are a planar view and a perspective view illustrating another example of the defrosting apparatus 370 applied to the refrigerator 300 in FIG. 1.

Referring to FIGS. 22 and 23, a heating unit 971 may be disposed at the outside of one side of a defrosting apparatus 970. Specifically, the heater case 971a may be located at an outer side of a support 933 provided at one side of an evaporator 930, and may extend in a perpendicular direction from a lower side to an upper side of the evaporator 930. In this case, at least a part of the heater case 971a may also be disposed between a first cooling pipe 931' and a second cooling pipe 931".

The heater case 971a is connected to a heat pipe 972, to form a circulation flow path through which the working fluid F can circulate. To this end, an outlet 971a1' and an inlet 971a1" are formed in upper and lower sides of the heater case 971a, respectively. The outlet 971a1' is connected to an extending portion 972a of the heat pipe 972, and the inlet 971a1" is connected to the lowest column of a heat dissipating portion 972b of the heat pipe 972.

A heater 971b is mounted to the heater case 871a and disposed vertically in an up-down direction of the evaporator 930. As described in the foregoing embodiments, the heater 971b may be mounted in the heater case 971a in various ways. For example, the heater 971b may be accommodated in a heater receiving part 971a2 formed to penetrate through the heater case 971a, or may be attached to one surface of the heater case 971a.

For reference, in FIG. 22, the inner flow path 971a1 and the heater receiving part 971a2 are formed to penetrate through the heater case 971a, and the heater 971b is accommodated in the heater receiving part 971a2. Although this drawing illustrates that the heater receiving part 971a2 is disposed at the outer side of the inner flow path 971a1, the present disclosure is not necessarily limited thereto. The heater receiving part 971a2 may alternatively be disposed at an inner side of the inner flow path 971a1, that is, between the inner flow path 971a1 and the support 933.

The heater 971b extends toward the outlet 971a1' between the inlet 971a1" and the outlet 971a1', thereby reheating the working fluid F collected back through the inlet 971a1". As such, the structure in which the inner flow path 971a1 extends upward, that is, in a vertical direction from the lower side to the upper side of the evaporator 930 is advantageous in that the working fluid F in the inner flow path 971a1 can be heated to form a rising flow and therefore a back flow of the working fluid F can be prevented.

On the other hand, the working fluid F is preferably filled in the heater case 971a to be higher than the uppermost column of the heater 971b extending in a vertical direction. In this configuration, a defrosting operation can be safely performed without overheating of the heating unit 971, and the continuous supply of the working fluid F in the gas state to the heat pipe 972 can be made stable.

The invention claimed is:

1. A defrosting apparatus comprising:
  a heater case that defines:
    an inner flow path passing through the heater case from an inlet defined at a first end of the heater case to an outlet defined at a second end of the heater case,
    a heater receiving part that passes through at least a portion of an inside of the heater case and that is spaced apart from the inner flow path, and
    grooves that are arranged along a circumference of the inner flow path and that extend along the inner flow path through the heater case, the grooves being recessed radially outward from the circumference of the inner flow path;
  a heat pipe inserted into the heater case through each of the inlet and the outlet and that is in communication with the inner flow path; and
  a heater accommodated in the heater receiving part and configured to heat working fluid in the inner flow path,
  wherein the inner flow path and the heater receiving part are separated from each other in the heater case,
  wherein the heat pipe includes a first heat pipe and a second heat pipe that are spaced apart from each other and have separate outer circumferential surfaces, each of the first heat pipe and the second heat pipe having (i) a first end portion connected to the inlet of the inner flow path and (ii) a second end portion connected to the outlet of the inner flow path, wherein the inlet of the inner flow path is a single opening that accommodates both of the first end portions of the first heat pipe and the second heat pipe, and wherein the outlet of the inner flow path is a single opening that accommodates both of the second end portions of the first heat pipe and the second heat pipe.

2. The defrosting apparatus of claim 1, wherein the heater is configured to, based on a temperature of the heater being greater than or equal to a preset temperature, limit an electric current therein by an increase of a resistance of the heater and thereby stop emitting heat.

3. The defrosting apparatus of claim 2, wherein the heater comprises:
   a positive temperature coefficient (PTC) thermistor having the resistance that increases based on an increase of the temperature of the heater; and
   a first electrode plate and a second electrode plate that face each other with the PTC thermistor being interposed therebetween.

4. The defrosting apparatus of claim 1, wherein the heater receiving part extends parallel to the inner flow path and has both ends open.

5. The defrosting apparatus of claim 4, wherein
   the heater case further defines a pressed portion that is recessed from an outer surface of the heater case toward the heater receiving part and that is configured to apply pressure to the heater in contact with an inner surface of the heater receiving part.

6. The defrosting apparatus of claim 5, further comprising a sealing member that is accommodated in the heater receiving part and that covers the heater received in the heater receiving part.

7. The defrosting apparatus of claim 1, wherein the grooves are arranged along an entire portion of the circumference of the inner flow path.

8. The defrosting apparatus of claim 1, wherein the heater case further defines holes that are arranged around the inner flow path and that extend parallel to the inner flow path, each of the holes being opened at the both ends of the heater case.

9. The defrosting apparatus of claim 8, wherein the holes are defined at positions between an outer periphery of the grooves and corners of the heater case.

10. The defrosting apparatus of claim 1, wherein:
    the heater case extends along a lateral direction; and
    the heater receiving part is defined at a position vertically above or below the inner flow path.

11. The defrosting apparatus of claim 1, further comprising:
    a first welding portion disposed between one end portion of the heat pipe and the outlet; and
    a second welding portion disposed between another end portion of the heat pipe and the inlet.

12. The defrosting apparatus of claim 1, wherein:
    the heater case is partitioned into an active heating part in which the heater is disposed and a passive heating part in which the heater is not disposed; and
    one end portion of the heat pipe is inserted into the inlet and configured to communicate with the passive heating part to thereby avoid backflow of heated working fluid from the inlet to the heat pipe.

13. The defrosting apparatus of claim 1, wherein the single opening of each of the inlet and the outlet has a first circular section, a second circular section spaced apart from the first circular section, and a connection section that connects between the first circular section and the second circular section, and wherein the circumference of the inner flow path surrounds and extends along the first circular section, the second circular section, and the connection section.

14. The defrosting apparatus of claim 13, wherein a diameter of each of the first circular section and the second circular section is greater than a width of the connection section.

15. A defrosting apparatus comprising:
    a heating unit comprising:
        a heater case that defines an inner flow path passing through the heater case from an inlet defined at a first end of the heater case to an outlet defined at a second end of the heater case, and
        a heater mounted in the heater case and configured to heat working fluid within the inner flow path; and
    a heat pipe that is inserted into the heater case through each of the inlet and the outlet and that is in communication with the inner flow path, at least a part of the heat pipe being disposed adjacent to a cooling pipe of an evaporator and configured to transfer heat from the working fluid heated by the heater to the cooling pipe of the evaporator,
    wherein the heater is configured to, based on a temperature of the heater being greater than or equal to a preset temperature, limit an electric current therein by an increase of a resistance of the heater and thereby stop emitting heat,
    wherein the heater case further defines grooves that are arranged along a circumference of the inner flow path and that extend along the inner flow path through the heater case, the grooves being recessed radially outward from the circumference of the inner flow path,
    wherein the heat pipe includes a first heat pipe and a second heat pipe that are spaced apart from each other and have separate outer circumferential surfaces, each of the first heat pipe and the second heat pipe having (i) a first end portion connected to the inlet of the inner flow path and (ii) a second end portion connected to the outlet of the inner flow path,
    wherein the inlet of the inner flow path is a single opening that accommodates both of the first end portions of the first heat pipe and the second heat pipe, and
    wherein the outlet of the inner flow path is a single opening that accommodates both of the second end portions of the first heat pipe and the second heat pipe.

16. The defrosting apparatus of claim 15, wherein the heater case further defines a heater receiving part that extends parallel to the inner flow path, that is open at the both ends of the heater case, and that accommodates the heater.

17. The defrosting apparatus of claim 15, wherein the heating unit further comprises:
    a holder that is mounted to the heater case and that covers the heater; and
    an elastic member that is in a compressed state, that is disposed between the heater and the holder, and that couples the heater to the heater case.

18. The defrosting apparatus of claim 15, wherein the heating unit further comprises:
    a heater mounting portion recessed upward into a bottom surface of the heater case; and
    a sealing member that is inserted into the heater mounting portion and that covers the heater attached to a recessed bottom surface of the heater mounting portion.

19. The defrosting apparatus of claim 18, wherein a bottom surface of the sealing member defines a bottom surface of the heater case.

20. The defrosting apparatus of claim 17, wherein the holder covers a bottom surface the heater case and side surfaces of the heater case, and
 wherein the elastic member is disposed between a bottom surface of the heater and a bottom surface of the holder.

* * * * *